(12) United States Patent
Matsumoto

(10) Patent No.: US 10,443,473 B2
(45) Date of Patent: Oct. 15, 2019

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Arifumi Matsumoto, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/846,653

(22) Filed: Dec. 19, 2017

(65) Prior Publication Data

US 2018/0179935 A1    Jun. 28, 2018

(30) Foreign Application Priority Data

Dec. 27, 2016    (JP) .................. 2016-252592

(51) Int. Cl.

| | |
|---|---|
| *F01N 3/20* | (2006.01) |
| *F02B 63/04* | (2006.01) |
| *B01D 53/94* | (2006.01) |
| *H02K 7/18* | (2006.01) |
| *F01N 11/00* | (2006.01) |

(52) U.S. Cl.
CPC ......... *F01N 3/208* (2013.01); *B01D 53/9418* (2013.01); *B01D 53/9495* (2013.01); *F01N 3/2066* (2013.01); *F01N 11/002* (2013.01); *F01N 11/007* (2013.01); *F02B 63/04* (2013.01); *H02K 7/1815* (2013.01); *F01N 2550/02* (2013.01); *F01N 2560/025* (2013.01); *F01N 2560/06* (2013.01); *F01N 2610/02* (2013.01); *F01N 2900/1402* (2013.01); *F01N 2900/1404* (2013.01); *F01N 2900/1602* (2013.01); *Y02T 10/24* (2013.01); *Y02T 10/47* (2013.01)

(58) Field of Classification Search
CPC . B01D 53/9418; B01D 53/9495; F02B 63/04; H02K 7/1815; F01N 3/2066; F01N 3/208; F01N 11/002; F01N 11/007; F01N 2550/02; F01N 2560/02; F01N 2560/025; F01N 2560/06; F01N 2610/02; F01N 2900/1402; F01N 2900/1404; Y02T 10/24; Y02T 10/47
USPC .................. 60/274, 277, 286, 295, 299–301
See application file for complete search history.

(56) References Cited

U.S. PATENT DOCUMENTS

| | | | |
|---|---|---|---|
| 8,783,017 B2 * | 7/2014 | Yezerets ................. | F01N 3/208 60/286 |
| 9,567,888 B2 * | 2/2017 | Gupta ..................... | F01N 3/208 |

(Continued)

FOREIGN PATENT DOCUMENTS

| | | |
|---|---|---|
| JP | 2009-293605 | 12/2009 |
| JP | 2018-105236 A | 7/2018 |

*Primary Examiner* — Mark A Laurenzi
*Assistant Examiner* — Dapinder Singh
(74) *Attorney, Agent, or Firm* — Finnegan, Henderson, Farabow, Garrett & Dunner, LLP

(57) ABSTRACT

A reducing agent is supplied to an NOx selective catalytic reduction catalyst in a suitable manner, while suppressing NOx from being produced by oxidation of ammonia in the NOx catalyst. In cases where the temperature of the NOx catalyst is equal to or higher than a predetermined temperature at which ammonia is oxidized, an amount of the reducing agent to be supplied to the NOx catalyst is made larger, when an air fuel ratio of exhaust gas flowing into the NOx catalyst is small, than it is large.

6 Claims, 17 Drawing Sheets

(56) References Cited

U.S. PATENT DOCUMENTS

2012/0023905 A1* 2/2012 Yezerets ................ F01N 3/208
   60/274
2015/0275730 A1* 10/2015 Gupta ..................... F01N 3/208
   60/274
2018/0179936 A1 6/2018 Matsumoto

* cited by examiner

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2016-252592 filed on Dec. 27, 2016 the entire contents of which are incorporated by reference herein.

TECHNICAL FIELD

The present disclosure relates to an exhaust gas purification apparatus for an internal combustion engine.

DESCRIPTION OF THE RELATED ART

There has been known an NOx selective catalytic reduction catalyst (hereinafter, also referred to simply as an "NOx catalyst") which purifies (removes or reduces) NOx contained in an exhaust gas from an internal combustion engine by using ammonia as a reducing agent. At the upstream side of this NOx catalyst, there is arranged an addition valve or the like which serves to add ammonia or a precursor of ammonia (hereinafter, ammonia or a precursor thereof being also referred to as an "additive agent") into the exhaust gas. As the precursor of ammonia, there can be mentioned urea, for example.

Here, in cases where the temperature of the exhaust gas is high, ammonia can be oxidized to produce NOx. When ammonia decreases due to the oxidation of ammonia, ammonia runs short in the NOx catalyst, so it can become difficult to remove or reduce NOx. For that reason, there is known a technology in which in cases where the temperature of the exhaust gas is high, the degree of oxidation of ammonia is calculated based on the temperature of the exhaust gas and the flow rate of the exhaust gas, and the amount of addition of urea is made to increase, as this degree of oxidation is large (for example, refer to patent literature 1).

CITATION LIST

Patent Literature

Patent Literature 1: Japanese Patent Application Laid-Open Publication No. 2009-293605

SUMMARY

Technical Problem

Here, in cases where the temperature of the NOx catalyst is high, ammonia can be oxidized to produce NOx in the NOx catalyst. Accordingly, as in the past, in cases where the temperature of the exhaust gas is high, when the amount of addition of urea is made to increase as the degree of oxidation of ammonia is larger, the amount of ammonia to be oxidized in the NOx catalyst can also increase. Then, when a large amount of NOx is produced in the NOx catalyst, the amount of NOx flowing out of the NOx catalyst will increase.

Accordingly, the present disclosure has for its object to supply a reducing agent to an NOx catalyst in a suitable manner, while suppressing NOx from being produced by oxidation of ammonia in the NOx catalyst.

Solution to Problem

In order to achieve the above-mentioned object, an exhaust gas purification apparatus for an internal combustion engine according to the present disclosure comprises: an NOx selective catalytic reduction catalyst that is arranged in an exhaust passage of the internal combustion engine and selectively reduces NOx in an exhaust gas by using ammonia as a reducing agent; an addition valve that is arranged in said exhaust passage at the upstream side of said NOx selective catalytic reduction catalyst and adds ammonia or a precursor of ammonia into the exhaust gas; a temperature sensor configured to acquire a temperature of said NOx selective catalytic reduction catalyst; an air fuel ratio sensor configured to acquire an air fuel ratio of the exhaust gas flowing into said NOx selective catalytic reduction catalyst; and a controller configured to make an amount of ammonia or the precursor of ammonia to be added into the exhaust gas from said addition valve larger, when the air fuel ratio acquired by said air fuel ratio sensor is small, than when it is large, in cases where the temperature acquired by said temperature sensor is equal to or higher than a predetermined temperature at which ammonia is oxidized.

Here, when the air fuel ratio of the exhaust gas is small even in cases where the temperature of the NOx catalyst is smaller than the predetermined temperature, the oxidation of ammonia in the NOx catalyst is suppressed. That is, by adding the additive agent from the addition valve when the air fuel ratio of the exhaust gas is small, NOx can be purified (removed or reduced) in the NOx catalyst, while suppressing oxidation of ammonia in the NOx catalyst. Then, ammonia becomes more difficult to be oxidized when the air fuel ratio of the exhaust gas is small than when it is large, and so by making the amount of the additive agent relatively larger when the air fuel ratio of the exhaust gas is small than when it is large, a larger amount of NOx can be reduced when the air fuel ratio of the exhaust gas is small, whereas the oxidation of ammonia in the NOx catalyst can be suppressed when the air fuel ratio of the exhaust gas is large. Here, note that the smaller the air fuel ratio of the exhaust gas flowing into the NOx catalyst, the larger the amount of the additive agent to be added from the addition valve may also be made. In this case, the amount of the additive agent may be changed in a stepwise manner, or may be changed continuously.

In addition, said controller can estimate an amount of ammonia adsorbed to said NOx selective catalytic reduction catalyst, and in cases where the temperature acquired by said temperature sensor is equal to or higher than said predetermined temperature, when the air fuel ratio of the exhaust gas flowing into said NOx selective catalytic reduction catalyst at the time the amount of ammonia adsorbed to said NOx selective catalytic reduction catalyst is smaller than a predetermined amount of adsorption is larger than a predetermined air fuel ratio, said controller can make the air fuel ratio of the exhaust gas flowing into said NOx selective catalytic reduction catalyst equal to or less than said predetermined air fuel ratio.

The predetermined air fuel ratio is, for example, an air fuel ratio at which the ratio of ammonia to be oxidized with respect to the ammonia flowing into the NOx catalyst falls within an allowable range, in the case where the temperature of the NOx catalyst is equal to or higher than the predetermined temperature. The predetermined amount of adsorption is, for example, an amount of adsorption of ammonia in which the reduction rate of NOx (or NOx reduction rate) falls within an allowable range in the NOx catalyst. In this case, when the amount of adsorption of ammonia in the NOx catalyst is smaller than the predetermined amount of adsorption, the NOx reduction rate can drop lower than the allowable range. In such a case, it is desirable to supply the additive agent to the NOx catalyst, but a condition where the air fuel ratio of the exhaust gas is larger than the predetermined air fuel ratio may continue, depending on an operating state of the internal combustion engine. In contrast to this, by actively changing the air fuel ratio of the exhaust gas flowing into the NOx catalyst, the air fuel ratio of the exhaust gas is made equal to or less than the predetermined air fuel ratio, whereby it becomes possible to supply a larger amount of additive agent to the NOx catalyst, while suppressing the oxidation of ammonia.

Moreover, provision can be further made for a generator that generates electricity by means of power of said internal combustion engine, and said controller can make an air fuel ratio of a mixture smaller, when a torque produced by said internal combustion engine is large, than when it is small, such that an amount of power generated by said generator is increased and the torque produced by said internal combustion engine is increased, thereby making the air fuel ratio of the exhaust gas flowing into said NOx selective catalytic reduction catalyst equal to or less than said predetermined air fuel ratio.

In cases where the amount of power generated by the generator, which generates electricity by the power of the internal combustion engine, is caused to increase, a torque used for the generation of electricity in the entire torque produced by the internal combustion engine increases. When the amount of power generated by the generator is caused to increase, the torque produced by the internal combustion engine is caused to increase in accordance with an amount of increase in the amount of power generation, in order to keep the rotation speed of the internal combustion engine from changing. Thus, the torque produced by the internal combustion engine increases, so the air fuel ratio of the mixture in the internal combustion engine is made small. Accordingly, the air fuel ratio of the exhaust gas able to flow into the NOx catalyst can be made equal to or less than the predetermined air fuel ratio.

Further, said NOx selective catalytic reduction catalyst can be configured by including a first NOx catalyst and a second NOx catalyst that is arranged in said exhaust passage at the downstream side of said first NOx catalyst. Said temperature sensor can be configured so as to be a first temperature sensor for acquiring the temperature of said first NOx catalyst, and provision can be further made for a second temperature sensor configured to acquire the temperature of said second NOx catalyst. Said controller can estimate an amount of ammonia adsorbed to said second NOx catalyst, and in cases where the temperature of said first NOx catalyst acquired by said first temperature sensor is equal to or higher than said predetermined temperature, in cases where the temperature of said second NOx catalyst acquired by said second temperature sensor is lower than a second predetermined temperature, and in cases where the amount of ammonia adsorbed to said second NOx catalyst is equal to or less than a predetermined lower limit adsorption amount, said controller can make the amount of ammonia or the amount of the precursor thereof to be added into the exhaust gas from said addition valve larger, when the air fuel ratio acquired by said air fuel ratio sensor is small, than when it is large.

The predetermined lower limit adsorption amount is, for example, a lower limit value of the amount of adsorption of ammonia in which the NOx reduction rate falls within an allowable range in the second NOx catalyst, or an amount of adsorption of ammonia in which a certain amount of margin is given to the lower limit value of the amount of adsorption of ammonia in which the NOx reduction rate falls within the allowable range in the second NOx catalyst. Here, the first NOx catalyst is arranged in the exhaust passage at the upstream side of the second NOx catalyst, so the temperature of the first NOx catalyst is apt to become higher than the temperature of the second NOx catalyst. Thus, even in cases where the first NOx catalyst reaches a temperature at which ammonia is oxidized, the second NOx catalyst may not reach the temperature at which ammonia is oxidized. In such a case, by causing ammonia to be adsorbed to the second NOx catalyst in advance, NOx can be removed or reduced in said second NOx catalyst. Then, if an amount of the additive agent excessive for the first NOx catalyst is supplied thereto from the addition valve so that the additive agent may pass through the first NOx catalyst, the additive agent can be supplied to the second NOx catalyst. In this manner, by supplying the additive agent to the second NOx catalyst, the amount of adsorption of ammonia in the second NOx catalyst can be made larger than the predetermined lower limit adsorption amount. However, when the air fuel ratio of the exhaust gas is large, ammonia will be oxidized in the first NOx catalyst, so it will become difficult to increase the amount of adsorption of ammonia in the second NOx catalyst, and besides, the amount of NOx flowing into the second NOx catalyst will increase. In contrast to this, by making the amount of the additive agent more when the air fuel ratio of the exhaust gas is small than when it is large, a larger amount of the additive agent can be supplied to the second NOx catalyst when the air fuel ratio of the exhaust gas is small, whereas by decreasing the amount of the additive agent, the oxidation of ammonia in the first NOx catalyst can be suppressed when the air fuel ratio of the exhaust gas is large. Here, note that the predetermined temperature is a temperature at which ammonia is oxidized in the first NOx catalyst, and the second predetermined temperature is a temperature at which ammonia is oxidized in the second NOx catalyst.

In addition, in cases where the temperature of said first NOx catalyst acquired by said first temperature sensor is equal to or higher than said predetermined temperature, and in cases where the temperature of said second NOx catalyst acquired by said second temperature sensor is lower than said second predetermined temperature, when the air fuel ratio of the exhaust gas flowing into said first NOx catalyst at the time the amount of the ammonia adsorbed to said second NOx catalyst is equal to or less than said predetermined lower limit adsorption amount is larger than the predetermined air fuel ratio, said controller can make the air fuel ratio of the exhaust gas flowing into said first NOx catalyst equal to or less than said predetermined air fuel ratio.

In cases where the amount of adsorption of ammonia in the second NOx catalyst is equal to or less than the predetermined lower limit adsorption amount, the NOx reduction rate may drop lower than the allowable range, so it is desirable to supply the additive agent to the second NOx catalyst. However, the air fuel ratio of the exhaust gas does not become equal to or less than the predetermined air fuel ratio, depending on the operating state of the internal combustion engine, and hence, the additive agent may not be able to be added from the addition valve. In such a case, the addition of the additive agent from the addition valve is made possible, by actively changing the air fuel ratio of the exhaust gas in such a manner that the air fuel ratio of the exhaust gas becomes equal to or less than the predetermined air fuel ratio.

Moreover, provision can be further made for a generator that generates electricity by means of power of said internal combustion engine, wherein said controller can make the air fuel ratio of a mixture smaller, when a torque produced by said internal combustion engine is large, than when it is small, such that an amount of power generated by said generator is increased and the torque produced by said internal combustion engine is increased, thereby making the air fuel ratio of the exhaust gas flowing into said first NOx catalyst equal to or less than said predetermined air fuel ratio.

As mentioned above, in cases where the amount of power generated by the generator is increased, the torque produced by the internal combustion engine is also increased, so the air fuel ratio of the mixture in the internal combustion engine is made smaller. Accordingly, the air fuel ratio of the exhaust gas able to flow into the first NOx catalyst can be made equal to or less than the predetermined air fuel ratio.

Advantageous Effects

According to the present disclosure, a reducing agent can be supplied to an NOx catalyst in a suitable manner, while suppressing NOx from being produced by oxidation of ammonia in the NOx catalyst.

DESCRIPTION OF THE EMBODIMENTS

Hereinafter, the modes for carrying out the present disclosure will be exemplarily described in detail based on embodiments with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
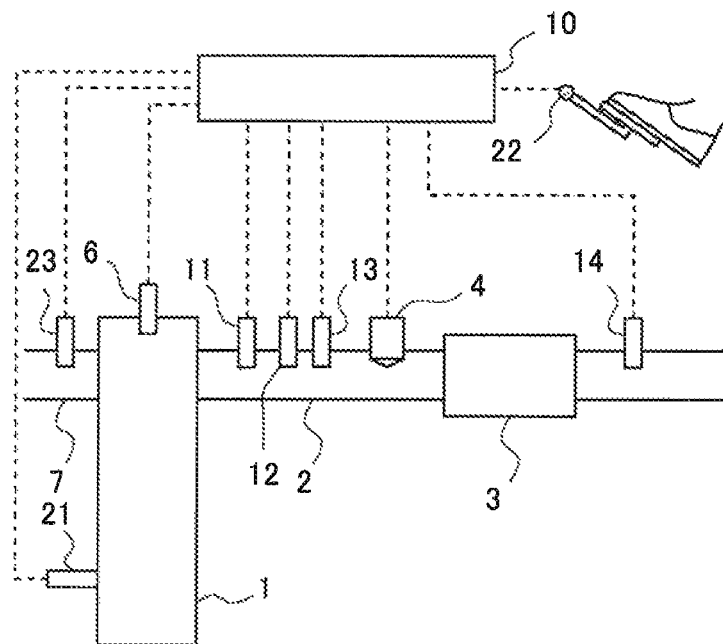
FIG. 1 is a view showing the schematic construction of an internal combustion engine and its exhaust system according to a first embodiment and a second embodiment of the present disclosure.

FIG. 1 is a view showing the schematic construction of an internal combustion engine and its exhaust system according to a first embodiment of the present disclosure. The internal combustion engine 1 is a diesel engine for driving a vehicle. However, the internal combustion engine 1 may be a gasoline engine. An exhaust passage 2 is connected to the internal combustion engine 1. In the exhaust passage 2, there is arranged an NOx selective catalytic reduction catalyst 3 (hereinafter, referred to as an "NOx catalyst 3") which serves to selectively reduce NOx in an exhaust gas with the use of ammonia as a reducing agent.

In the exhaust passage 2 at the upstream side of the NOx catalyst 3, there is arranged an addition valve 4 which serves to add urea water as a precursor of ammonia into an exhaust gas. The urea water added from the addition valve 4 is hydrolyzed into ammonia in the NOx catalyst 3, and the ammonia thus generated is adsorbed to the NOx catalyst 3. This ammonia is used as the reducing agent in the NOx catalyst 3. Here, note that the addition valve 4 may add ammonia in place of the urea water. Hereinafter, the precursor of ammonia and ammonia are each referred to as the "reducing agent".

Further, in the exhaust passage 2 at the upstream side of the addition valve 4, there are arranged an upstream side NOx sensor 11 that detects the concentration of NOx in the exhaust gas flowing into the NOx catalyst 3, an air fuel ratio sensor 12 that detects the air fuel ratio of the exhaust gas flowing into the NOx catalyst 3, and a temperature sensor 13 that detects the temperature of the exhaust gas flowing into the NOx catalyst 3. In addition, in the exhaust passage 2 at the downstream side of the NOx catalyst 3, there is arranged a downstream side NOx sensor 14 for detecting the concentration of NOx in the exhaust gas flowing out from the NOx catalyst 3. Here, note that in this embodiment, the temperature sensor 13 corresponds to a temperature sensor in the present disclosure, and the air fuel ratio sensor 12 corresponds to an air fuel ratio sensor in the present disclosure. On the internal combustion engine 1, there are mounted fuel injection valves 6 (though only one is shown) for injecting fuel into individual cylinders, respectively.

In addition, an intake passage 7 is connected to the internal combustion engine 1. An air flow meter 23 for detecting the amount of intake air in the internal combustion engine 1 is arranged in the intake passage 7.

Then, an ECU 10, which is an electronic control unit, is provided as a controller in combination with the internal combustion engine 1. The ECU 10 controls the internal combustion engine 1, an exhaust gas purification apparatus, and so on. A crank position sensor 21 and an accelerator opening sensor 22, in addition to the upstream side NOx sensor 11, the air fuel ratio sensor 12, the temperature sensor 13, and the downstream side NOx sensor 14, the air flow meter 23 as mentioned above, are electrically connected to the ECU 10, so that the detected values of these individual sensors are passed or transmitted to the ECU 10.

The ECU 10 is able to grasp the operating state of the internal combustion engine 1, such as the engine rotational speed based on the detection of the crank position sensor 21, the engine load based on the detection of the accelerator opening sensor 22, etc. Here, note that in this embodiment, the NOx in the exhaust gas flowing into the NOx catalyst 3 is able to be detected by the upstream side NOx sensor 11, but the NOx contained in the exhaust gas discharged from the internal combustion engine 1 (the exhaust gas before being purified or reduced in the NOx catalyst 3, i.e., the exhaust gas flowing into the NOx catalyst 3) has relation with the operating state of the internal combustion engine, and hence, is also able to be estimated based on the above-mentioned operating state of the internal combustion engine 1. In addition, the ECU 10 is able to estimate the temperature of the NOx catalyst 3 based on the temperature of the exhaust gas detected by the temperature sensor 13. Moreover, the temperature sensor 13 may be a sensor that detects the temperature of the NOx catalyst 3, in place of the temperature of the exhaust gas. Also, note that the temperature of the NOx catalyst 3 has relation to the operating state of the internal combustion engine 1, so it is also possible to estimate the temperature of the NOx catalyst 3 based on the above-mentioned operating state of the internal combustion engine 1. Further, the ECU 10 can calculate the flow rate of the exhaust gas based on the detected value of the air flow meter 23 and the amount of fuel injection from each of the fuel injection valves 6. On the other hand, the addition valve 4 and the fuel injection valve 6 are connected to the ECU 10 through electrical wiring, so that the addition valve 4 and the fuel injection valves 6 are controlled by the ECU 10.

The ECU 10 adds an additive agent from the addition valve 4 by using either of the following two kinds of methods. A first method of adding the additive agent is a method of detecting or estimating the amount of NOx flowing into the NOx catalyst 3, and adding an amount of additive agent corresponding to the amount of NOx thus detected or estimated. The control of adding the additive agent according to this first method is hereinafter referred to as equivalent ratio control. The equivalent ratio referred to herein is the ratio of the amount of the additive agent to be added from the addition valve 4 with respect to the amount of additive agent able to reduce the NOx flowing into the NOx catalyst 3 without excess and deficiency. Here, note that in cases where the equivalent ratio will be referred to below, it is assumed to indicate this equivalent ratio. The equivalent ratio control is carried out without regard to the amount of adsorption of ammonia in the NOx catalyst 3. In this embodiment, the equivalent ratio control is carried out, when the temperature of the NOx catalyst 3 is relatively high.

For example, in cases where a filter for trapping particulate matter (PM) is arranged in the exhaust passage 2 at the upstream side of the NOx catalyst 3, regeneration processing of the filter, which is processing for raising the temperature of the filter, is carried out in order to oxidize the PM trapped in the filter. At this time, the temperature of the NOx catalyst 3 goes up. Here, when the temperature of the NOx catalyst 3 becomes high, the amount of ammonia which can be adsorbed in the NOx catalyst 3 decreases, so when the regeneration processing of the filter is carried out, the amount of adsorption of ammonia in the NOx catalyst 3 is decreased. In addition, for example, in cases where an NOx storage reduction catalyst is arranged in the exhaust passage 2 at the upstream side of the NOx catalyst 3, sulfur recovery processing for recovering sulfur poisoning of the NOx storage reduction catalyst is carried out. At this time, the temperature of the NOx storage reduction catalyst is caused to rise, so the temperature of the NOx catalyst 3 also goes up, and the amount of adsorption of ammonia in the NOx catalyst 3 is decreased. Moreover, at the time of the high load operation of the internal combustion engine 1, exhaust gas of high temperature is discharged from the internal combustion engine 1, so the temperature of the NOx catalyst 3 goes up. For that reason, the amount of adsorption of ammonia in the NOx catalyst 3 is decreased. Thus, when the temperature of the NOx catalyst 3 becomes relatively high, it becomes difficult to make a sufficient amount of ammonia adsorbed in the NOx catalyst 3 in advance, and hence, the equivalent ratio control is carried out in which the additive agent is added according to the amount of NOx flowing into the NOx catalyst 3.

A second method of adding the additive agent is a method in which ammonia has been made to adsorb to the NOx catalyst 3 in advance in a range where an amount of saturated adsorption is not exceeded, and in which in cases where the ammonia adsorbed to the NOx catalyst 3 is decreased by the reduction of NOx, etc., an amount of additive agent corresponding to a decreased amount of ammonia is supplied. The control of adding the additive agent according to this second method is hereinafter referred to as adsorption amount control. This adsorption amount control is carried out based on the amount of adsorption of ammonia in the NOx catalyst 3. In this embodiment, the adsorption amount control is carried out, when the temperature of the NOx catalyst 3 is relatively low.

In the adsorption control, the ECU 10 adds the additive agent from the addition valve 4 in such a manner that the amount of adsorption of ammonia in the NOx catalyst 3 becomes a target value of the amount of adsorption of ammonia in the NOx catalyst 3 (hereinafter, also referred to as a target amount of adsorption). In this case, the ECU 10 calculates an amount of additive agent to be added from the addition valve 4 so as to make the amount of adsorption of ammonia in the NOx catalyst 3 equal to the target amount of adsorption, by compensating for an amount of ammonia which has been consumed in order to reduce NOx in the NOx catalyst 3 (hereinafter, also referred to as an amount of consumption of ammonia), and an amount of ammonia which has been desorbed from the NOx catalyst 3 and decreased without reducing NOx (hereinafter, also referred to as an amount of desorption of ammonia), in a period of time from a starting point in time of the last supply of the additive agent until a starting point in time of the current supply of the additive agent. The amount of consumption of ammonia is calculated based on the amount of NOx flowing into the NOx catalyst 3, the temperature of the NOx catalyst 3, and the target amount of adsorption in the NOx catalyst 3. The amount of desorption of ammonia is calculated based on the temperature of the NOx catalyst 3 and the target amount of adsorption in the NOx catalyst 3. Then, an amount of the additive agent corresponding to a total amount of the amount of consumption of ammonia and the amount of desorption of ammonia is added from the addition valve 4.

Figure 2:
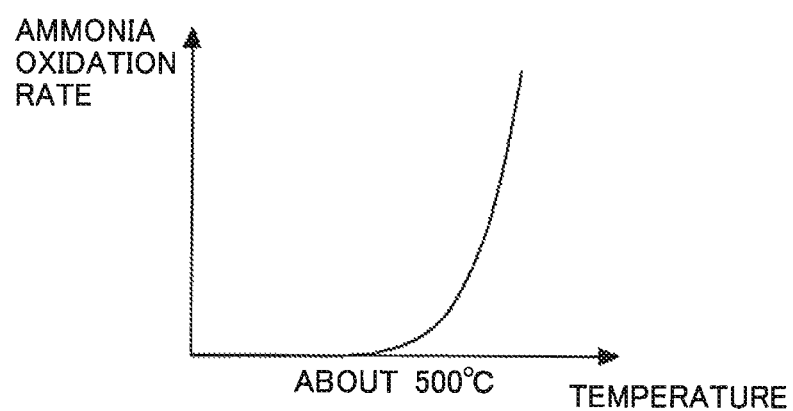
FIG. 2 is a view showing the relation between the temperature of an NOx catalyst and the rate of oxidation of ammonia.

Here, note that in this embodiment, in cases where the temperature of the NOx catalyst 3 is lower than the predetermined temperature, the adsorption amount control is carried out by the ECU 10, whereas in cases where the temperature of the NOx catalyst 3 is equal to or higher than the predetermined temperature, the equivalent ratio control is carried out by the ECU 10. The predetermined temperature referred to herein is a temperature (e.g., 500 degrees C.) at which the rate of oxidation of ammonia begins to increase when a sufficient amount of oxygen is contained in the exhaust gas. Here, FIG. 2 is a view showing the relation between the temperature of the NOx catalyst 3 and the rate of oxidation of ammonia. Because the oxidation of ammonia hardly takes place in cases where the temperature of the NOx catalyst 3 is lower than the predetermined temperature, the predetermined temperature may also be a temperature at which ammonia is oxidized (or a temperature at which the oxidation of ammonia begins), or a temperature at which the rate of oxidation of ammonia becomes equal to or more than the predetermined rate. When the temperature of the NOx catalyst 3 becomes equal to or higher than the predetermined temperature, the rate of oxidation of ammonia becomes large with the rise of the temperature. This predetermined temperature changes according to the kind of NOx catalyst 3, and can be obtained in advance through experiments, simulations, or the like.

Here, when the temperature of the NOx catalyst 3 becomes equal to or higher than the predetermined temperature, ammonia can be oxidized to produce NOx in the NOx catalyst 3. At this time, the higher the oxygen concentration of the exhaust gas, the more easily ammonia is oxidized. Accordingly, when the additive agent is added from the addition valve 4 in cases where the temperature of the NOx catalyst 3 is equal to or higher than the predetermined temperature and the oxygen concentration of the exhaust gas is high, ammonia can be oxidized to produce NOx in the NOx catalyst 3. On the other hand, if the oxygen concentration of the exhaust gas is low even though the temperature of the NOx catalyst 3 is equal to or higher than the predetermined temperature, when the additive agent is added from the addition valve 4, ammonia can be suppressed from being oxidized in the NOx catalyst 3. Accordingly, in this embodiment, in cases where the temperature of the NOx catalyst 3 is equal to or higher than the predetermined temperature, the equivalent ratio control is carried out so that the amount of the additive agent to be added from the addition valve 4 may become larger, when the air fuel ratio of the exhaust gas flowing into the NOx catalyst 3 is equal to or less than a predetermined air fuel ratio, than when it is larger than the predetermined air fuel ratio. That is, the NOx reduction rate at this time is enhanced by adding a larger amount of additive agent than when ammonia is in a state of being hard to oxidize. Here, note that the predetermined air fuel ratio is an air fuel ratio at which the ratio of ammonia to be oxidized with respect to the ammonia supplied to the NOx catalyst 3 falls within an allowable range, in the case where the temperature of the NOx catalyst 3 is equal to or higher than the predetermined temperature. This predetermined temperature can be obtained in advance through experiments, simulations, or the like.

Figure 3:
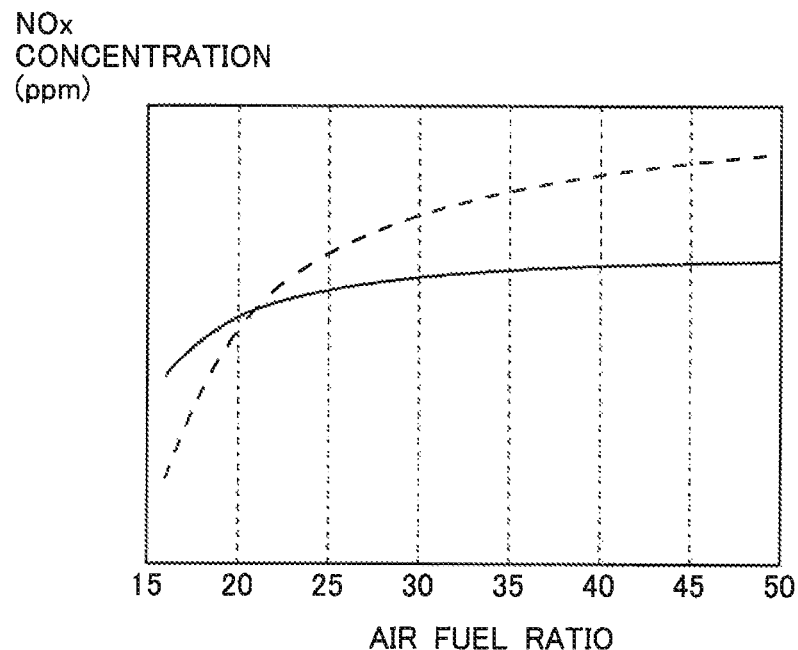
FIG. 3 is a view showing the relation between the air fuel ratio of exhaust gas flowing into the NOx catalyst and the concentration of NOx flowing out from the NOx catalyst, in cases where the temperature of the NOx catalyst is equal to or higher than a predetermined temperature.

Here, FIG. 3 is a view showing the relation between the air fuel ratio of the exhaust gas flowing into the NOx catalyst 3 and the concentration of NOx flowing out from the NOx catalyst 3, in cases where the temperature of the NOx catalyst 3 is equal to or higher than the predetermined temperature. A solid line indicates a case where the equivalent ratio is set to 0.5, and a broken line indicates a case where the equivalent ratio is set to 2. In cases where the air fuel ratio of the exhaust gas is smaller than 20, the concentration of NOx in the exhaust gas flowing out from the NOx catalyst 3 is lower when the equivalent ratio is 2 than when the equivalent ratio is 0.5. That is, in the case where the equivalent ratio is 0.5, it is in a state where the amount of the additive agent is short or insufficient for the amount of NOx flowing into the NOx catalyst 3, so the NOx which can not be reduced by the NOx catalyst 3 flows out from the NOx catalyst 3. On the other hand, in the case where the equivalent ratio is 2, it is in a state where a sufficient amount of additive agent is supplied with respect to the amount of NOx flowing into the NOx catalyst 3, so the NOx is reduced in the NOx catalyst 3, and the amount of NOx flowing out of the NOx catalyst 3 becomes small. With air fuel ratios in this range, the oxygen concentration of the exhaust gas is low and the oxidation of ammonia is suppressed, so the amount of NOx produced by the oxidation of ammonia is small. Accordingly, in the air fuel ratios in this range, because a larger amount of NOx is reduced as the equivalent ratio is larger (i.e., as the amount of addition of the additive agent is larger), so the concentration of NOx in the exhaust gas at the downstream side of the NOx catalyst 3 becomes low.

On the other hand, in cases where the air fuel ratio of the exhaust gas is larger than 20, for example, the concentration of NOx in the exhaust gas flowing out from the NOx catalyst 3 becomes lower when the equivalent ratio is 0.5 than when the equivalent ratio is 2. In the case where the equivalent ratio is 0.5, it is in a state where the amount of the additive agent is short or insufficient for the amount of NOx flowing into the NOx catalyst 3, so the NOx flows out from the NOx catalyst 3. On the other hand, when the equivalent ratio is 2, the concentration of NOx in the exhaust gas flowing out from the NOx catalyst 3 is high, in spite of a sufficient amount of the additive agent being added. This is because ammonia is oxidized to produce NOx in the NOx catalyst 3. When the equivalent ratio is 0.5, the amount of ammonia supplied to the NOx catalyst 3 is small, so the amount of NOx produced by the oxidation of ammonia is also small, and an increase in the concentration of NOx in the exhaust gas is suppressed. Accordingly, in this embodiment, the above-mentioned predetermined air fuel ratio is set to 20, for example.

Figure 4:
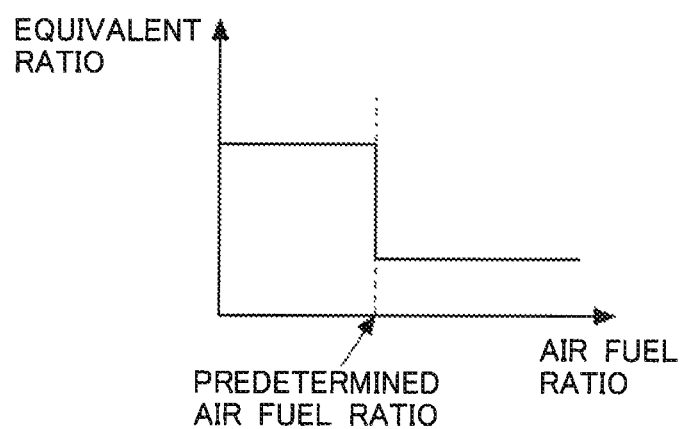
FIG. 4 is a view showing the relation between the air fuel ratio of the exhaust gas flowing into the NOx catalyst and an equivalent ratio set in the first embodiment, in cases where the temperature of the NOx catalyst is equal to or higher than the predetermined temperature.

FIG. 4 is a view showing the relation between the air fuel ratio of the exhaust gas flowing into the NOx catalyst 3 and the equivalent ratio set in the this embodiment, in cases where the temperature of the NOx catalyst 3 is equal to or higher than the predetermined temperature. Thus, in the case where the air fuel ratio of the exhaust gas is equal to or less than the predetermined air fuel ratio, the equivalent ratio is made larger than in the case where it is larger than the predetermined air fuel ratio. Here, note that the ammonia adsorbed to the NOx catalyst 3 at the time when the air fuel ratio of the exhaust gas is equal to or less than the predetermined air fuel ratio may be oxidized at the time when the air fuel ratio of the exhaust gas becomes larger than the predetermined air fuel ratio, thus resulting in a fear that NOx will be produced. For that reason, each equivalent ratio is set in such a manner that an amount of NOx decreased by an increase in ammonia at the time when the air fuel ratio of the exhaust gas is equal to or less than the predetermined air fuel ratio may become larger than an amount of NOx produced by the oxidation of ammonia at the time when the air fuel ratio of the exhaust gas is larger than the predetermined air fuel ratio. Further, the equivalent ratio set in the case where the air fuel ratio of the exhaust gas is larger than the predetermined air fuel ratio is set in such a manner that the amount of NOx flowing out from the NOx catalyst 3 becomes a minimum within a range where the amount of addition of the additive agent is permitted. The relation shown in FIG. 4 has been obtained in advance through experiments, simulations, or the like.

Figure 5:
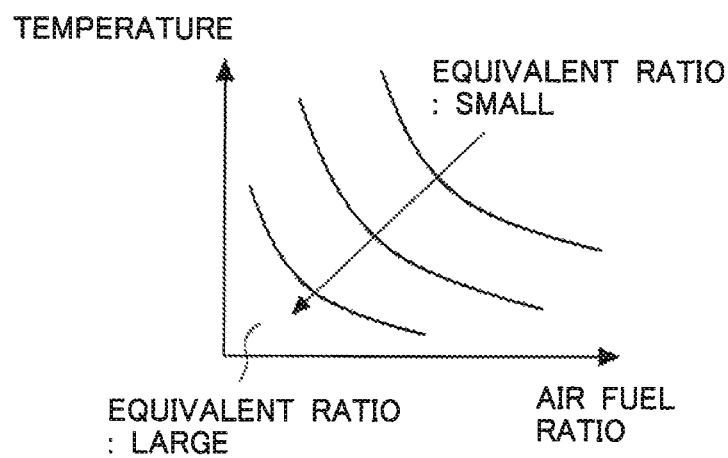
FIG. 5 is a view showing the relation between the air fuel ratio of the exhaust gas flowing into the NOx catalyst, the temperature of the NOx catalyst, and the equivalent ratio set in the first embodiment, in cases where the temperature of the NOx catalyst is equal to or higher than the predetermined temperature.

Here, note that the equivalent ratio may be set according to the relation shown in the following FIG. 5, in place of the relation shown in FIG. 4. FIG. 5 is a view showing the relation between the air fuel ratio of the exhaust gas flowing into the NOx catalyst 3, the temperature of the NOx catalyst 3, and the equivalent ratio, in cases where the temperature of the NOx catalyst 3 is equal to or higher than the predetermined temperature. In FIG. 5, equivalent ratio distributions are shown by equi-equivalent ratio lines, each of which is a line connecting points or locations having an equal equivalent ratio. In cases where the temperature of the NOx catalyst 3 is the same, the smaller the air fuel ratio of the exhaust gas, the more difficultly ammonia becomes oxidized, so the equivalent ratio is made larger. In addition, in cases where the air fuel ratio of the exhaust gas is the same, the lower the temperature of the NOx catalyst 3, the more difficultly ammonia becomes oxidized, so the equivalent ratio is made larger. Here, note that the relation shown in FIG. 5 may be applied only in cases where the air fuel ratio of the exhaust gas is equal to or less than the predetermined air fuel ratio, as shown in FIG. 4, or may be applied without regard to whether the air fuel ratio of the exhaust gas is equal to or less than the predetermined air fuel ratio. The relation shown in FIG. 5 has been obtained in advance through experiments, simulations, or the like.

Figure 6:
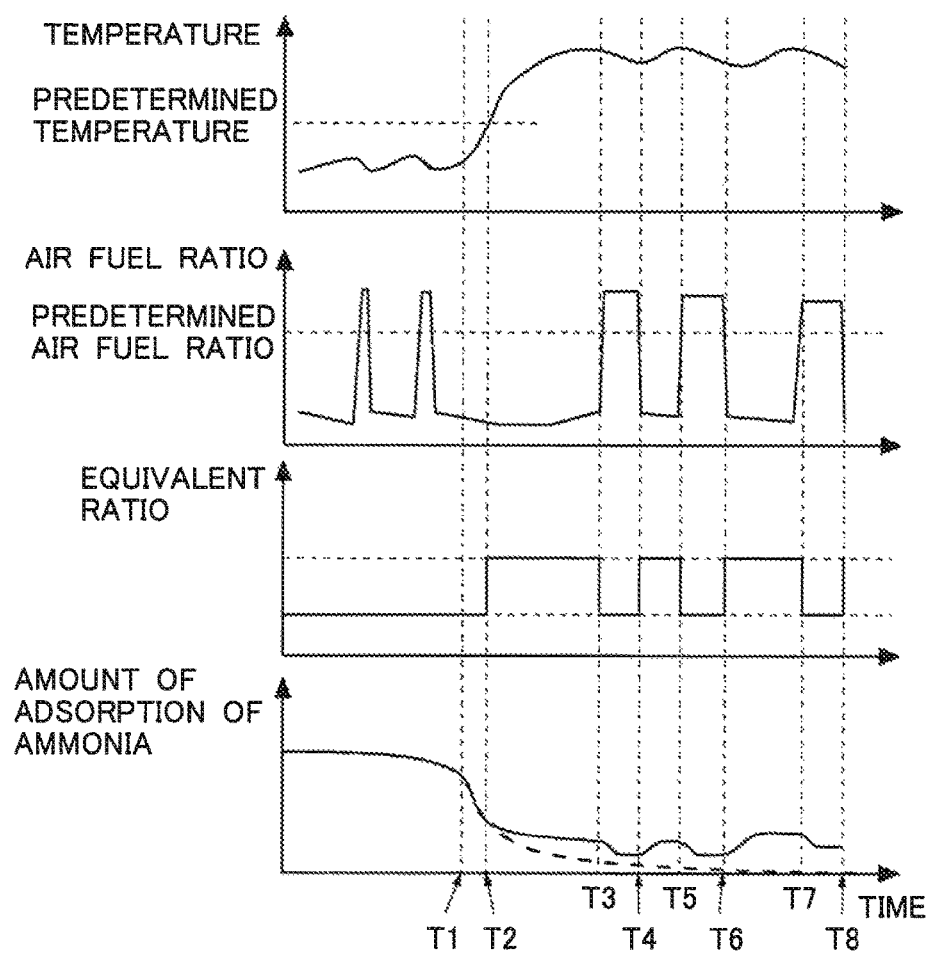
FIG. 6 is a time chart showing the changes over time of the temperature of the NOx catalyst, the air fuel ratio of the exhaust gas flowing into the NOx catalyst (this may be the air fuel ratio in a cylinder of the internal combustion engine), the equivalent ratio, and the amount of ammonia adsorbed to the NOx catalyst (amount of adsorption of ammonia), in cases where equivalent ratio control according to the first embodiment is carried out.

Next, FIG. 6 is a time chart showing the changes over time of the temperature of the NOx catalyst 3, the air fuel ratio of the exhaust gas flowing into the NOx catalyst 3 (this may be the air fuel ratio in a cylinder of the internal combustion engine 1), the equivalent ratio, and the amount of ammonia adsorbed to the NOx catalyst 3 (the amount of adsorption of ammonia), in cases where equivalent ratio control according to the first embodiment is carried out. Also, FIG. 6 is a view showing changes over time of various kinds of values in cases where the filter regeneration processing is carried out, for example. A broken line in the amount of adsorption of ammonia of FIG. 6 shows a case where the equivalent ratio is set constant without regard to the air fuel ratio of the exhaust gas (in cases where the equivalent ratio is fixed to 1, for example).

T1 is a point in time at which the regeneration processing of the filter is started, and T2 is a point in time at which the temperature of the NOx catalyst 3 has reached the predetermined temperature. A period of time from T2 to T3, a period of time from T4 to T5, and a period of time from T6 to T7 are periods of time in which the air fuel ratio of the exhaust gas is equal to or less than the predetermined air fuel ratio. On the other hand, a period of time from T3 to T4, a period of time from T5 to 16, and a period of time from T7 to T8 are periods of time in which the air fuel ratio of the exhaust gas is larger than the predetermined air fuel ratio. When the regeneration processing of the filter is carried out, the internal combustion engine 1 is operated at an air fuel ratio larger than the predetermined air fuel ratio, and exhaust gas of high temperature is discharged from the internal combustion engine 1, whereby the temperature of the filter is raised. Even when this regeneration processing of the filter is being carried out, at the time of acceleration, etc., the internal combustion engine 1 is operated at an air fuel ratio which is equal to or less than the predetermined air fuel ratio. In such a manner, the equivalent ratio is made relatively large when the air fuel ratio of the exhaust gas is equal to or less than the predetermined air fuel ratio. Thus, even in cases where the equivalent ratio is made large, the air fuel ratio is equal to or less than the predetermined air fuel ratio, so ammonia is suppressed from being oxidized beyond the allowable range. For this reason, in cases where the air fuel ratio of the exhaust gas is equal to or less than the predetermined air fuel ratio, a decrease in the amount of adsorption of ammonia is suppressed.

On the other hand, in FIG. 6, when the internal combustion engine 1 is operated at an air fuel ratio larger than the predetermined air fuel ratio, the equivalent ratio is made relatively small. At this time, the oxygen concentration of the exhaust gas is high, so ammonia is apt to be oxidized. In contrast to this, by making the equivalent ratio small, an amount of ammonia flowing into the NOx catalyst 3 is decreased, and hence, even if the ammonia is oxidized, an amount of the ammonia thus oxidized can be decreased.

Figure 7:
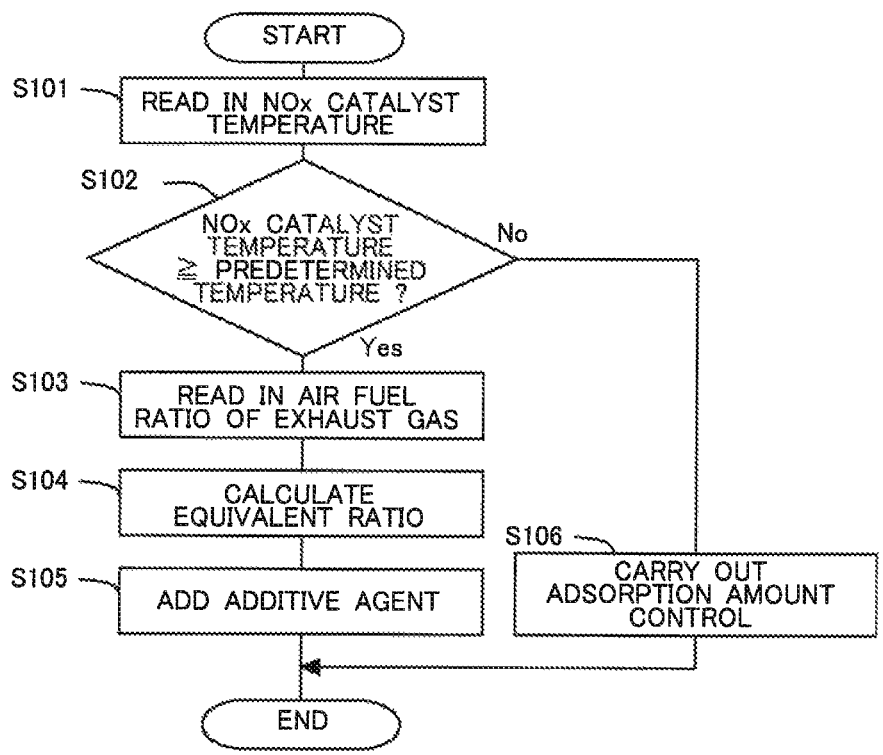
FIG. 7 is a flow chart showing a flow for addition control of an additive agent according to the first embodiment of the present disclosure.

FIG. 7 is a flow chart showing a flow or routine for addition control of the additive agent according to this embodiment of the present disclosure. The routine in this flow chart is carried out by means of the ECU 10 at each predetermined time interval.

In step S101, the temperature of the NOx catalyst 3 is read in. The temperature of the NOx catalyst 3 is detected by the temperature sensor 13. Here, note that it is also possible to detect the temperature of the NOx catalyst 3 based on the operating state of the internal combustion engine 1, without using the temperature sensor 13.

In step S102, it is determined whether the temperature of the NOx catalyst 3 read in step S101 is equal to or higher than the predetermined temperature. In this step S102, it is determined whether the equivalent ratio control is carried out. In cases where an affirmative determination is made in step S102, the routine goes to step S103 in order to carry out the equivalent ratio control. On the other hand, in cases where a negative determination is made in step S102, the routine goes to step S106, where the adsorption amount control is carried out. For the adsorption amount control, well-known technologies can be used, so the explanation thereof will be omitted. Here, note that in step S106, in place of the adsorption amount control, another control to add the additive agent without regard to the air fuel ratio of the exhaust gas may be carried out.

In step S103, the air fuel ratio of the exhaust gas flowing into the NOx catalyst 3 is read in. This air fuel ratio of the exhaust gas can be detected by the air fuel ratio sensor 12. The ECU 10 reads in a detected value of the air fuel ratio sensor 12.

In step S104, the equivalent ratio is calculated based on the air fuel ratio of the exhaust gas read in step S103. The ECU 10 calculates the equivalent ratio according to the relation shown in FIG. 4 or FIG. 5. In this case, the amount of additive agent to be added into the exhaust gas from the addition valve 4 becomes larger when the air fuel ratio is small than when it is large. In step S105, the additive agent is added so as to provide the addition ratio calculated in step S104. Here, note that in this embodiment, the ECU 10, which carries out the processing of steps S104 and step S105, corresponds to a controller in the present disclosure.

As described above, even in cases where the air fuel ratio is large, it is possible to decrease the amount of ammonia oxidized at the time of the air fuel ratio being large, by decreasing the amount of the additive agent to be supplied. Further, by increasing the amount of additive agent to be supplied in the case of the air fuel ratio being small, it is possible to increase the amount of NOx reduced at the time of the air fuel ratio being small. From these, it is possible to decrease the amount of NOx flowing out of the NOx catalyst 3. That is, the NOx reduction rate as an entire system can be improved, by supplying an appropriate amount of additive agent to the NOx catalyst 3, while suppressing the production of NOx in the NOx catalyst 3.

Second Embodiment

In the above-mentioned first embodiment, the air fuel ratio of the exhaust gas becomes equal to or less than the predetermined air fuel ratio, only at the time of high load operation such as acceleration, etc. For that reason, when light load operation continues, the equivalent ratio can not be made large, so the NOx reduction rate may drop. Accordingly, in a second embodiment of the present disclosure, in cases where the amount of adsorption of ammonia in an NOx catalyst 3 is smaller than a predetermined amount of adsorption, the air fuel ratio of the exhaust gas flowing into the NOx catalyst 3 is actively made smaller than the predetermined air fuel ratio. The predetermined amount of adsorption is an amount of adsorption of ammonia in the NOx catalyst 3 in which the NOx reduction rate falls within an allowable range. The predetermined amount of adsorption has been obtained in advance through experiments, simulations or the like. In this manner, by actively making the air fuel ratio of the exhaust gas smaller than the predetermined air fuel ratio, the equivalent ratio can be made larger, so that a larger amount of ammonia can be supplied to the NOx catalyst 3.

As a technique of making the air fuel ratio of the exhaust gas smaller than the predetermined air fuel ratio, there can be mentioned a technique in which a gas having a small air fuel ratio is caused to discharge from the internal combustion engine 1, by carrying out a main injection into a cylinder of the internal combustion engine 1, which is fuel injection for producing torque, and then further carrying out a post injection, which is fuel injection at the time when a rise in torque does not pose a problem. In addition, provision is made for a fuel addition valve for adding fuel into an exhaust passage 2 at a location upstream of the NOx catalyst 3, and the air fuel ratio of the exhaust gas flowing into the NOx catalyst 3 can also be made small, by injecting fuel from the fuel addition valve.

An ECU 10 estimates the amount of adsorption of ammonia in the NOx catalyst 3. The amount of adsorption of ammonia estimated here is an amount of adsorption of ammonia at the current point in time which is calculated assuming that an addition valve 4 is normal. In this second embodiment, the amount of adsorption of ammonia in the NOx catalyst 3 is calculated by integrating an amount of change per unit time of the amount of adsorption of ammonia in the NOx catalyst 3. The amount of change per unit time of the amount of adsorption of ammonia in the NOx catalyst 3 can be obtained by subtracting an amount of decrease per unit time of the amount of adsorption of ammonia from an amount of increase per unit time thereof. The amount of increase per unit time of the amount of adsorption of ammonia in the NOx catalyst 3 is calculated based on the amount of the additive agent per unit time added from the addition valve 4. In addition, the amount of decrease per unit time of the amount of adsorption of ammonia in the NOx catalyst 3 is a total amount of an amount of additive agent per unit time consumed in the NOx catalyst 3 (hereinafter, an amount of consumed ammonia), and an amount of additive agent per unit time desorbed from NOx catalyst 3 (hereinafter, an amount of desorbed ammonia).

The amount of additive agent per unit time added from the addition valve 4 can be known based on the amount of the additive agent calculated by the ECU 10. The amount of additive agent per unit time consumed in the NOx catalyst 3 is associated with the NOx reduction rate in the NOx catalyst 3, the flow rate of the exhaust gas per unit time of the internal combustion engine 1, and the concentration of NOx in the exhaust gas flowing into the NOx catalyst 3, and so, it can be calculated based on these values. Here, note that the flow rate of the exhaust gas may be calculated based on the amount of intake air and the amount of fuel injection, or may be detected by a sensor, or may be estimated based on the operating state of the internal combustion engine 1.

The NOx reduction rate in the NOx catalyst 3 is associated with the temperature of the NOx catalyst 3, the flow rate of the exhaust gas, and the amount of adsorption of ammonia in the NOx catalyst 3, and so, it can be calculated based on these values. As the amount of adsorption of ammonia used for calculation of the NOx reduction rate, there is used an amount of adsorption of ammonia calculated at the time of the last calculation. If the relation among the NOx reduction rate in the NOx catalyst 3, the temperature of the NOx catalyst 3, the flow rate of the exhaust gas, and the amount of adsorption of ammonia in the NOx catalyst 3 has been obtained in advance by experiments, simulations or the like, the NOx reduction rate can be obtained based on the temperature of the NOx catalyst 3, the flow rate of the exhaust gas, and the amount of adsorption of ammonia in the NOx catalyst 3. Here, note that the relation among them may also have been made into a map in advance.

In addition, the amount of additive agent per unit time desorbed from the NOx catalyst 3 is associated with the temperature of the NOx catalyst 3, and the amount of adsorption of ammonia in the NOx catalyst 3, and so, it can be calculated based on these values. The amount of adsorption of ammonia used for calculation of the amount of additive agent per unit time desorbed from the NOx catalyst 3, there is used an amount of adsorption of ammonia calculated at the time of the last calculation. If the relation among the temperature of the NOx catalyst 3, the amount of adsorption of ammonia therein, and the amount of desorbed ammonia has been obtained in advance by experiments, simulations or the like, the amount of desorbed ammonia can be obtained based on the temperature of the NOx catalyst 3 and the amount of adsorption of ammonia therein. Here, note that the relation among them may also have been made into a map in advance.

As described above, it is possible to calculate the amount of change per unit time of the amount of adsorption of ammonia in the NOx catalyst 3. The amount of adsorption of ammonia at the current point in time can be calculated by integrating this value. Here, note that the amount of change in the amount of adsorption of ammonia is calculated at each operation period of the ECU 10, and the amount of adsorption of ammonia at the current point in time can also be calculated by integrating this amount of change.

Figure 8:
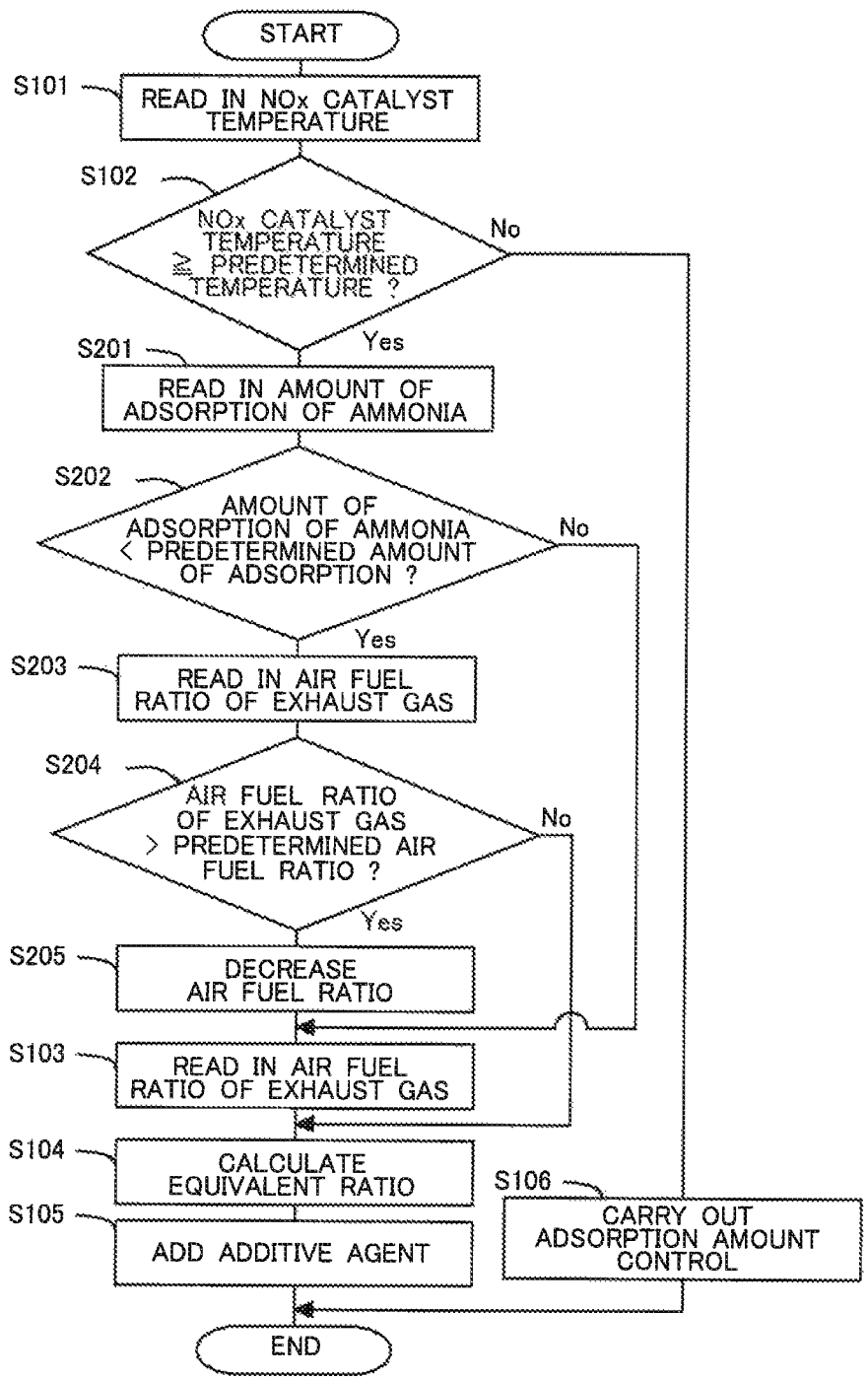
FIG. 8 is a flow chart showing a flow for addition control of an additive agent according to a second embodiment of the present disclosure.

FIG. 8 is a flow chart showing a flow or routine for addition control of the additive agent according to this second embodiment of the present disclosure. The routine in this flow chart is carried out by means of the ECU 10 at each predetermined time interval. Here, note that for those steps in which the same processings as in the flow shown in FIG. 7 are carried out, the same reference numerals and characters are attached and the explanation thereof is omitted.

In the flow chart shown in FIG. 8, in cases where an affirmative determination is made in step S102, the routine goes to step S201. In step S201, the amount of adsorption of ammonia in the NOx catalyst 3 is read in. The amount of adsorption of ammonia in the NOx catalyst 3 is separately calculated by the ECU 10.

In step S202, it is determined whether the amount of adsorption of ammonia is smaller than the predetermined amount of adsorption. In cases where an affirmative determination is made in step S202, the routine goes to step S203, whereas in cases where a negative determination is made, the routine goes to step S103.

In step S203, the air fuel ratio of the exhaust gas flowing into the NOx catalyst 3 is read in. Then, in step S204, it is determined whether the air fuel ratio of the exhaust gas read in step S203 exceeds the predetermined air fuel ratio. In this step S204, it is determined whether it is difficult to increase the amount of addition of the additive agent, because the air fuel ratio of the exhaust gas is in such a large state that ammonia is oxidized. In cases where an affirmative determination is made in step S204, the routine goes to step S205, whereas in cases where a negative determination is made, the routine goes to step S104.

In step S205, the air fuel ratio of the exhaust gas flowing into the NOx catalyst 3 is made to drop or decrease. The air fuel ratio of the exhaust gas flowing into the NOx catalyst 3 is made to drop, for example, by carrying out a post injection after a main injection in the internal combustion engine 1, or by being provided with a fuel addition valve for adding fuel into the exhaust gas upstream of the NOx catalyst 3, and performing the addition of fuel from the fuel addition valve. At this time, the air fuel ratio of the exhaust gas flowing into the NOx catalyst 3 is made to drop so as to be equal to or less than the predetermined air fuel ratio.

In this manner, even in cases where the air fuel ratio of the exhaust gas is larger than the predetermined air fuel ratio, by actively decreasing the air fuel ratio of the exhaust gas, the equivalent ratio can be made large, while suppressing the oxidation of ammonia, so that the additive agent can be supplied to the NOx catalyst 3. As a result of this, it is possible to suppress the NOx reduction rate from dropping or becoming low.

Third Embodiment

Figure 9:
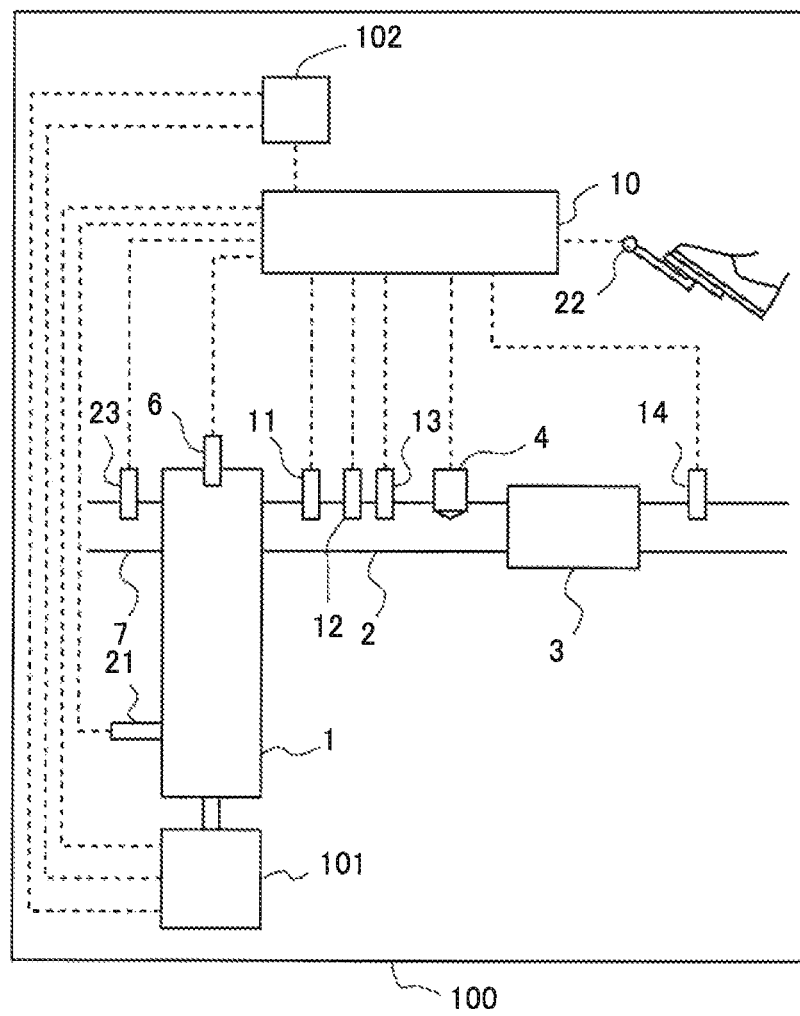
FIG. 9 is a view showing the schematic construction of an internal combustion engine and its exhaust system according to a third embodiment of the present disclosure.

FIG. 9 is a view showing the schematic construction of an internal combustion engine and its exhaust system according to a third embodiment of the present disclosure. In the following, a construction different from that shown in FIG. 1 will mainly be explained. An internal combustion engine 1 according to this third embodiment is mounted on a hybrid vehicle 10. In addition, a generator 101 is mounted on the hybrid vehicle 100. With the hybrid vehicle 100, electricity or electric power can be generated by means of the generator 101 using the internal combustion engine 1 as a power source. A battery 102 is connected to the generator 101 through electrical wiring. Also, an ECU is connected to the generator 101 through electrical wiring, so that the generator 101 is controlled by means of the ECU 10.

Figure 10:
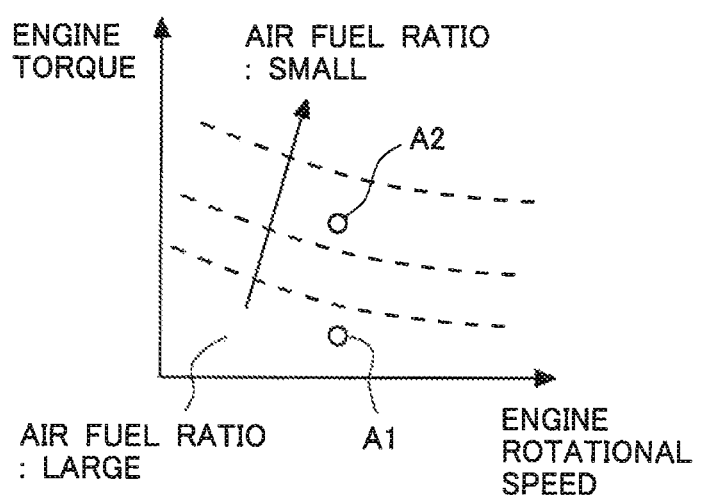
FIG. 10 is a view showing the relation between an engine rotational speed, an engine torque, and the air fuel ratio of a mixture in the internal combustion engine.

In this third embodiment, as a technique to increase the air fuel ratio of exhaust gas, there is adopted a technique to increase the torque produced by the internal combustion engine 1. Then, in this embodiment, in order to increase the torque produced by the internal combustion engine 1, the amount of power generated by the generator 101 is made to increase. Here, FIG. 10 is a view showing the relation between an engine rotational speed, an engine torque, and the air fuel ratio of a mixture in the internal combustion engine 1. In FIG. 10, broken lines indicate equal air fuel ratio lines each of which is a line connecting those locations where the air fuel ratios are equal. A point indicated by A1 in FIG. 10 is an engine torque which is required for the hybrid vehicle 100 to travel at an engine rotational speed at that time. Also, a point indicated by A2 in FIG. 10 is an engine torque which has been increased from the point indicated by A1, by increasing the amount of power generated by the generator 101 without changing the engine rotational speed. A difference between the engine torque at the point A2 and that at the point A1 corresponds to an amount of increase in the amount of power generated by the generator 101.

As shown in FIG. 10, the larger the engine torque, the smaller becomes the air fuel ratio of the exhaust gas. Accordingly, as the engine torque becomes larger, the air fuel ratio of the mixture combusted in the internal combustion engine 1 becomes smaller, so the air fuel ratio of the exhaust gas flowing into the NOx catalyst 3 becomes smaller. Then, by increasing the engine torque according to the increasing amount of power generation in the generator 101, the engine torque to be distributed for driving the hybrid vehicle 100 can be adjusted to the engine torque at the point indicated by A1 in FIG. 10. As a result of this, it is possible to suppress the speed of the hybrid vehicle 100 from being changed. The electricity generated by the generator 101 is stored in the battery 102. In this manner, when electricity is stored in the battery 102, the distance, for which the hybrid vehicle 100 can be driven, will thereafter be extended by the electric power thus stored, thus making it possible to suppress deterioration in fuel economy.

Figure 11:
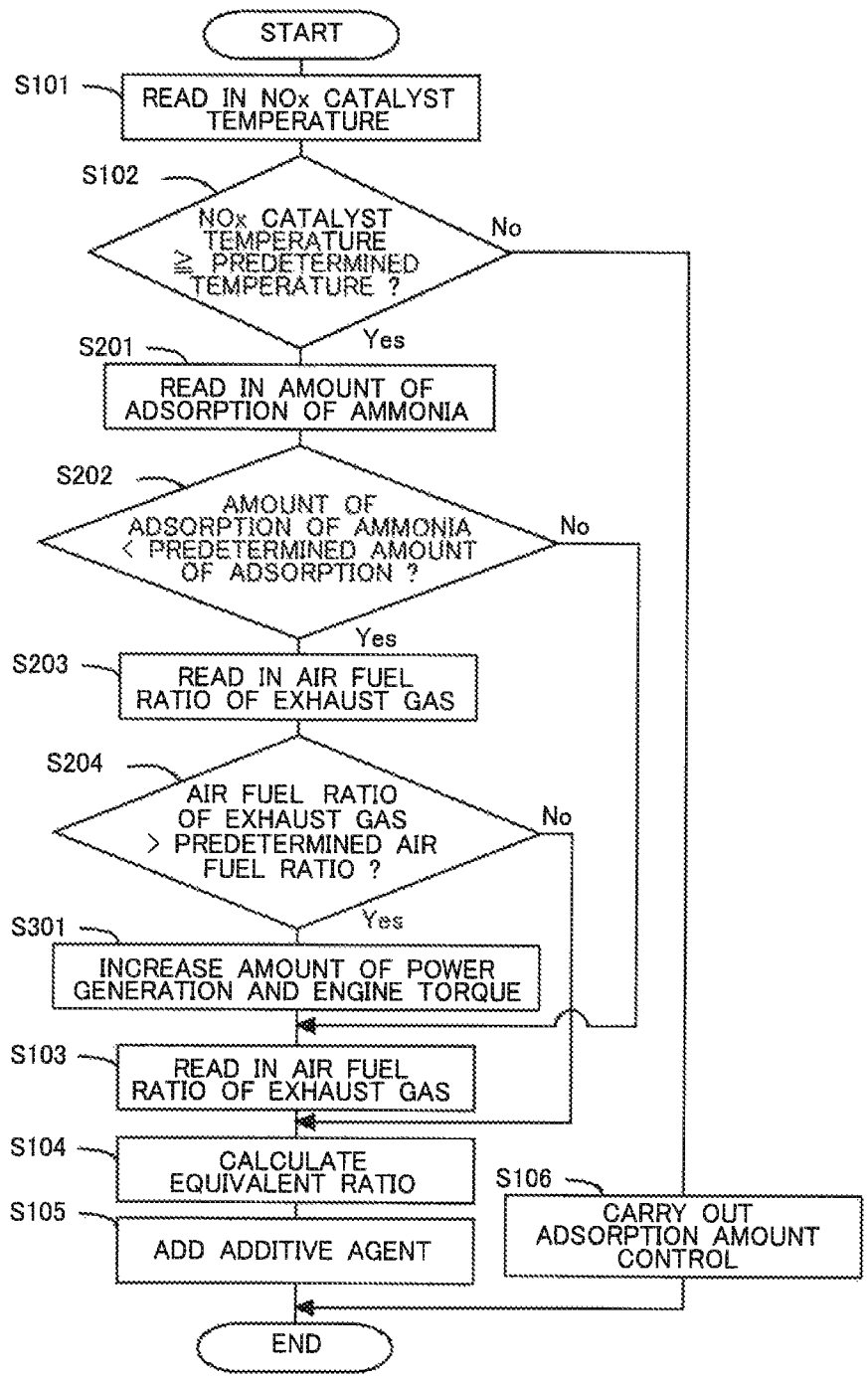
FIG. 11 is a flow chart showing a flow for addition control of an additive agent according to the third embodiment of the present disclosure.

FIG. 11 is a flow chart showing a flow or routine for addition control of the additive agent according to this third embodiment of the present disclosure. The routine in this flow chart is carried out by means of the ECU 10 at each predetermined time interval. Here, note that for those steps in which the same processings as in the aforementioned flow charts are carried out, the same reference numerals and characters are attached and the explanation thereof is omitted.

In the flow chart shown in FIG. 11, in cases where an affirmative determination is made in step S204, the routine goes to step S301. In step S301, the amount of power generated by the generator 101 is increased. With this, the engine torque is increased, and the air fuel ratio of the exhaust gas flowing into the NOx catalyst 3 drops accompanying this. At this time, the amount of power generated by the generator 101 is adjusted so that the air fuel ratio of the exhaust gas flowing into the NOx catalyst 3 may become equal to or less than the predetermined air fuel ratio. That is, the ECU 10 calculates, based on the relation shown in FIG. 10, the engine torque at which the air fuel ratio of the exhaust gas becomes equal to or less than the predetermined air fuel ratio at the engine rotational speed at the current point in time, and sets the amount of power generated by the generator 101 so as to provide the engine torque thus calculated. The relation shown in FIG. 10 has been obtained in advance through experiments, simulations, or the like.

Thus, even in cases where the air fuel ratio of the exhaust gas is larger than the predetermined air fuel ratio, the air fuel ratio can be decreased to a value equal to or less than the predetermined air fuel ratio, by making the engine torque larger, while increasing the amount of power generated by the generator 101. With this, the additive agent can be supplied to the NOx catalyst 3, while making the equivalent ratio larger, so it is possible to suppress a decrease in the NOx reduction rate.

Fourth Embodiment

Figure 12:
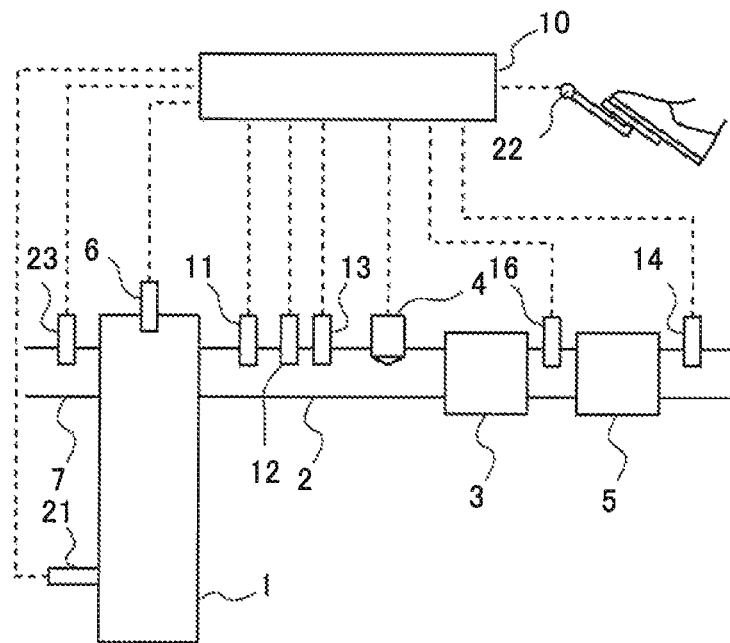
FIG. 12 is a view showing the schematic construction of an internal combustion engine and its exhaust system according to a fourth embodiment and a fifth embodiment of the present disclosure.

FIG. 12 is a view showing the schematic construction of an internal combustion engine and its exhaust system according to a fourth embodiment of the present disclosure. In the following, a construction different from that shown in FIG. 1 will mainly be explained. In the construction shown in FIG. 12, two NOx selective catalytic reduction catalysts are arranged in the exhaust passage 2. That is, a second NOx selective catalytic reduction catalyst 5 is arranged at the downstream side of the NOx catalyst 3. Here, note that in the following, the NOx catalyst 3 at the upstream side is referred to as a first NOx catalyst 3, and the NOx selective catalytic reduction catalyst 5 at the downstream side is referred to as a second NOx catalyst 5. A second temperature sensor 16 for detecting the temperature of the exhaust gas flowing into the second NOx catalyst 5 is arranged in the exhaust passage 2 at the downstream of the first NOx catalyst 3 and at the upstream side of the second NOx catalyst 5. In addition, a downstream side NOx sensor 14 is arranged in the exhaust passage 2 at the downstream side of the second NOx catalyst 5. An ECU 10 is able to estimate the temperature of the second NOx catalyst 5 based on the temperature of the exhaust gas detected by the second temperature sensor 16. Moreover, the second temperature sensor 16 may be a sensor that detects the temperature of the second NOx catalyst 5, in place of the temperature of the exhaust gas. Here, note that the temperature of the second NOx catalyst 5 has relation to the operating state of the internal combustion engine 1, so it is also possible to estimate the temperature of the second NOx catalyst 5 based on the above-mentioned operating state of the internal combustion engine 1. In this fourth embodiment, the temperature sensor 13 corresponds to a first temperature sensor in the present disclosure, and the second temperature sensor 16 corresponds to a second temperature sensor in the present disclosure.

Here, in order to quickly raise the temperature of an NOx catalyst at the time of cold start of the internal combustion engine 1, the NOx catalyst may be arranged in the exhaust passage 2 at a relatively upstream side thereof so that the NOx catalyst may be brought close to the internal combustion engine 1. Thus, by arranging the NOx catalyst in such a manner as to bring it close to the internal combustion engine 1, the temperature of the NOx catalyst becomes apt to rise with the heat possessed by the exhaust gas. However, there may not exist a sufficient space for arranging the NOx catalyst in the vicinity of the internal combustion engine 1. In addition, in order to reduce NOx to a sufficient extent, the NOx catalyst is required to have a certain amount of capacity. Accordingly, the second NOx catalyst may be arranged at a position away from the internal combustion engine 1.

Because the first NOx catalyst 3 according to this fourth embodiment is arranged at a position relatively close to the internal combustion engine 1, the temperature thereof is apt to be raised by the heat of the exhaust gas at the time of cold start of the internal combustion engine 1. However, at the time of regeneration processing of the filter, at the time of sulfur poisoning recovery processing or at the time of high load operation, etc., the exhaust gas of high temperature flows into the first NOx catalyst 3, whereby the temperature of the first NOx catalyst 3 becomes too high, and adsorption of ammonia therein can become difficult. On the other hand, the second NOx catalyst 5 is arranged at a position relatively far away from the internal combustion engine 1, so even in cases where the temperature of the exhaust gas flowing into the first NOx catalyst 3 is high, the heat of the exhaust gas is taken by the first NOx catalyst 3 and the exhaust passage 2, as a consequence of which the temperature of the exhaust gas will drop by the time it reaches the second NOx catalyst 5. For that reason, a rise in the temperature of the second NOx catalyst 5 is suppressed. Accordingly, even when the temperature of the first NOx catalyst 3 becomes too high and the adsorption of ammonia is difficult, ammonia may be able to be adsorbed in the second NOx catalyst 5. In such a case, by having made ammonia adsorbed to the second NOx catalyst 5 in advance, NOx can be reduced in the second NOx catalyst 5 by using the ammonia thus adsorbed in advance.

In order to supply the additive agent to the second NOx catalyst 5, the additive agent may be added from the addition valve 4 in such a manner as to be caused to flow out from the first NOx catalyst 3. That is, the additive agent is supplied to the second NOx catalyst 5 by making the additive agent flow out of the first NOx catalyst 3 by adding from the addition valve 4 a larger amount of additive agent than an amount of additive agent which can be adsorbed in the first NOx catalyst 3. However, in cases where the temperature of the first NOx catalyst 3 is equal to or higher than the predetermined temperature, ammonia may be oxidized to produce NOx in the first NOx catalyst 3. Accordingly, it may become difficult to supply the additive agent to the second NOx catalyst 5, and a large amount of NOx may flow into the second NOx catalyst 5. For that reason, it may become difficult to reduce NOx in the second NOx catalyst 5. In contrast to this, in this fourth embodiment, in cases where the temperature of the first NOx catalyst 3 is equal to or higher than the predetermined temperature, the amount of addition of the additive agent is adjusted based on the air fuel ratio of the exhaust gas flowing into the first NOx catalyst 3, so that ammonia may not be oxidized in the first NOx catalyst 3. That is, the amount of the additive agent to be added from the addition valve may be made larger, when the air fuel ratio of the exhaust gas flowing into the first NOx catalyst 3 is small, than when it is large.

Figure 13:
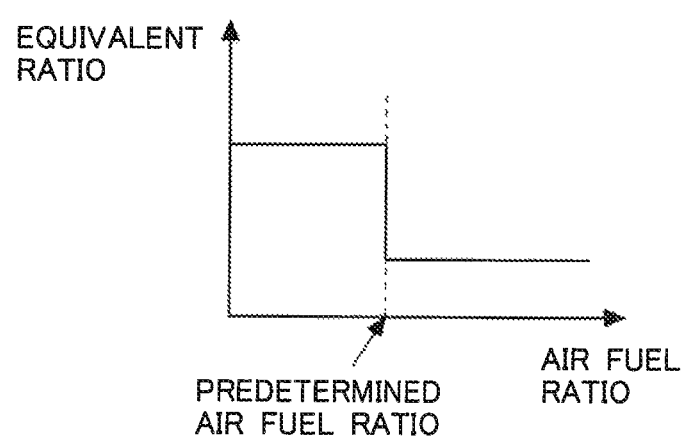
FIG. 13 is a view showing the relation between the air fuel ratio of exhaust gas flowing into a first NOx catalyst and an equivalent ratio set in the fourth and fifth embodiments, in cases where the temperature of the first NOx catalyst is equal to or higher than a predetermined temperature.

FIG. 13 is a view showing the relation between the air fuel ratio of the exhaust gas flowing into the first NOx catalyst 3 and the equivalent ratio set in this fourth embodiment, in cases where the temperature of the first NOx catalyst 3 is equal to or higher than the predetermined temperature. Thus, in the case where the air fuel ratio of the exhaust gas is equal to or less than the predetermined air fuel ratio, the equivalent ratio is made larger than in the case where it is larger than the predetermined air fuel ratio. In the case where the air fuel ratio of the exhaust gas is equal to or less than the predetermined air fuel ratio, the equivalent ratio is set such that the additive agent can flow out from the first NOx catalyst 3, and can be supplied to the second NOx catalyst 5. Here, note that the amount of additive agent flowing out from the first NOx catalyst 3 is decided according to the temperature of the first NOx catalyst 3, the amount of NOx flowing into the first NOx catalyst 3, the air fuel ratio of the exhaust gas flowing into the first NOx catalyst 3, and the flow rate of the exhaust gas. Accordingly, the amount of additive agent caused to flow out from the first NOx catalyst 3 may be calculated according to the amount of adsorption of ammonia in the second NOx catalyst 5, and the amount of addition of the additive agent from the addition valve 4 may be calculated such as to attain the amount of additive agent caused to flow out from the first NOx catalyst 3 thus calculated. In addition, in the case where the air fuel ratio of the exhaust gas flowing into the first NOx catalyst 3 is equal to or larger than the predetermined air fuel ratio, it is difficult to supply the additive agent to the second NOx catalyst 5, and hence, the additive agent is added from the addition valve 4 in such a manner as to remove or reduce NOx in the first NOx catalyst 3. The equivalent ratio set in this case is set in such a manner that the amount of NOx flowing out from the first NOx catalyst 3 becomes a minimum within a range where the amount of addition of the additive agent is permitted. These relations have been obtained in advance through experiments, simulations, or the like.

Figure 14:
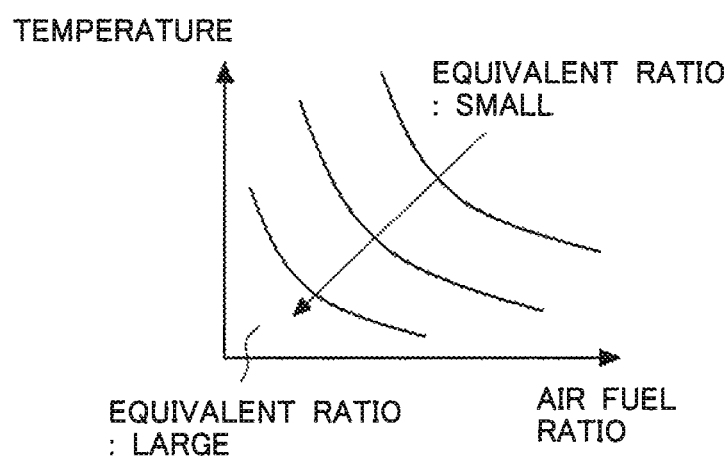
FIG. 14 is a view showing the relation between the air fuel ratio of the exhaust gas flowing into the first NOx catalyst, the temperature of the first NOx catalyst, and the equivalent ratio set in the fourth and fifth embodiments, in cases where the temperature of the first NOx catalyst is equal to or higher than the predetermined temperature.

In addition, the equivalent ratio may be set according to the relation shown in the following FIG. 14, in place of the relation shown in FIG. 13. FIG. 14 is a view showing the relation between the air fuel ratio of the exhaust gas flowing into the first NOx catalyst 3, the temperature of the first NOx catalyst 3, and the equivalent ratio set in this fourth embodiment, in cases where the temperature of the first NOx catalyst 3 is equal to or higher than the predetermined temperature. In FIG. 14, equivalent ratio distributions are shown by equi-equivalent ratio lines, each of which is a line connecting points or locations having an equal equivalent ratio. In cases where the temperature of the first NOx catalyst 3 is the same, the smaller the air fuel ratio of the exhaust gas, the larger the equivalent ratio is made. Also, in cases where the air fuel ratio of the exhaust gas is the same, the lower the temperature of the first NOx catalyst 3, the larger the equivalent ratio is made. Here, note that the relation shown in FIG. 14 may be applied only in cases where the air fuel ratio of the exhaust gas is equal to or less than the predetermined air fuel ratio, or may be applied without regard to whether the air fuel ratio of the exhaust gas is equal to or less than the predetermined air fuel ratio. This relation has been obtained in advance through experiments, simulations, or the like.

Here, note that in this fourth embodiment, in cases where the temperature of the first NOx catalyst 3 is equal to or higher than the predetermined temperature, when the air fuel ratio of the exhaust gas is equal to or less than the predetermined air fuel ratio, and when the amount of adsorption of ammonia in the second NOx catalyst 5 becomes less than a first amount of adsorption, the supply of the additive agent to the second NOx catalyst 5 is started, and when the air fuel ratio of the exhaust gas becomes larger than the predetermined air fuel ratio or the amount of adsorption of ammonia in the second NOx catalyst 5 becomes equal to or larger than a second amount of adsorption, the supply of the additive agent to the second NOx catalyst 5 is stopped. The first adsorption amount is a lower limit value of the amount of adsorption of ammonia in which the NOx reduction rate falls within an allowable range in the second NOx catalyst 5, or an amount of adsorption of ammonia in which a certain amount of margin is given to the lower limit value of the amount of adsorption of ammonia in which the NOx reduction rate falls within the allowable range in the second NOx catalyst 5. In place of this, the first amount of adsorption may also be an amount of adsorption of ammonia in which there occurs a need to make ammonia adsorbed to the second NOx catalyst 5. In addition, the second amount of adsorption is an amount of adsorption of ammonia in which the amount of adsorption of ammonia in the second NOx catalyst 5 can be said to be sufficient for reducing NOx. Here, note that in this fourth embodiment, the first amount of adsorption corresponds to a predetermined lower limit adsorption amount in the present disclosure.

Figure 15:
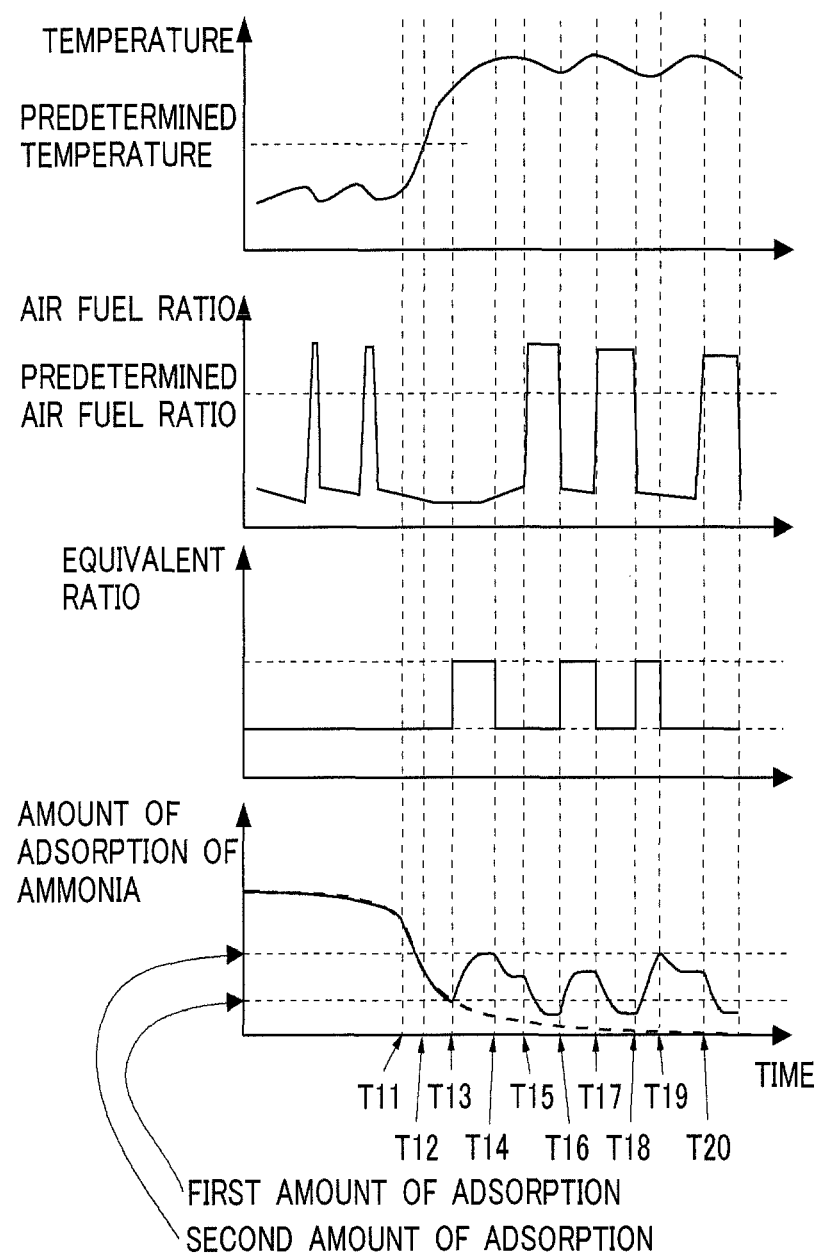
FIG. 15 is a time chart showing the changes over time of the temperature of the first NOx catalyst, the air fuel ratio of the exhaust gas flowing into the first NOx catalyst (this may be the air fuel ratio in a cylinder of the internal combustion engine), the equivalent ratio, and the amount of ammonia adsorbed to the second NOx catalyst (amount of adsorption of ammonia), in cases where equivalent ratio control according to the fourth embodiment is carried out.

FIG. 15 is a time chart showing the changes over time of the temperature of the first NOx catalyst 3, the air fuel ratio of the exhaust gas flowing into the first NOx catalyst 3 (this may be the air fuel ratio in a cylinder of the internal combustion engine 1), the equivalent ratio, and the amount of ammonia adsorbed to the second NOx catalyst 5 (the amount of adsorption of ammonia), in cases where equivalent ratio control according to the first embodiment is carried out. FIG. 15 is a view showing changes over time of various kinds of values in cases where filter regeneration processing is carried out, for example. A broken line in the amount of adsorption of ammonia of FIG. 15 shows a case where the equivalent ratio is set constant without regard to the air fuel ratio of the exhaust gas (in cases where the equivalent ratio is fixed to 1, for example). In FIG. 15, the additive agent is added from the addition valve 4, by setting, as a target range of the amount of adsorption of ammonia, a range where the amount of adsorption of ammonia in the second NOx catalyst 5 becomes larger than the first amount of adsorption and smaller than the second amount of adsorption.

T11 is a point in time at which the regeneration processing of the filter is started, and T12 is a point in time at which the temperature of the first NOx catalyst 3 has reached the predetermined temperature. A period of time from T12 to T15, a period of time from T16 to T17, and a period of time from T18 to T20 are periods of time in which the air fuel ratio of the exhaust gas is equal to or less than the predetermined air fuel ratio. On the other hand, a period of time from T15 to T16, a period of time from T17 to T18, and a period of time from T20 to T21 are periods of time in which the air fuel ratio of the exhaust gas is larger than the predetermined air fuel ratio.

In a period of time from T11 to T13, the amount of adsorption of ammonia in the second NOx catalyst 5 is larger than the first amount of adsorption, so it is not necessary to supply ammonia to the second NOx catalyst 5, and accordingly, the equivalent ratio is set to a relatively small value. In this period of time, the amount of ammonia supplied to the second NOx catalyst 5 is small with respect to the amount of NOx flowing into the second NOx catalyst 5, so the amount of adsorption of ammonia in the second NOx catalyst 5 decreases.

Then, at T13, the amount of adsorption of ammonia in the second NOx catalyst 5 has decreased to the first amount of adsorption. At this time, the air fuel ratio of the exhaust gas is equal to or less than the predetermined air fuel ratio, and hence, the equivalent ratio can be set to a relatively large value. That is, ammonia in the first NOx catalyst 3 is in a state where it is hard to be oxidized, so a large amount of additive agent can be made to flow out from the first NOx catalyst 3, by adding an abundant amount of additive agent from the addition valve 4. As a result of this, the amount of ammonia supplied to the second NOx catalyst 5 can be made large, thus making it possible to increase the amount of adsorption of ammonia in the second NOx catalyst 5.

Moreover, when the amount of adsorption of ammonia in the second NOx catalyst 5 has reached the second amount of adsorption at T14, a sufficient amount of ammonia has been adsorbed to the second NOx catalyst 5, so the equivalent ratio is set to a relatively small value in order to decrease the amount of ammonia to be supplied to the second NOx catalyst 5. With this, the amount of adsorption of ammonia in the second NOx catalyst 5 is decreased from T14.

At T15, the air fuel ratio of the exhaust gas has become larger than the predetermined air fuel ratio, but at this time, the equivalent ratio has already been set to the relatively small value, and the equivalent ratio is not made to change. Then, from T15, the degree of decrease in the amount of adsorption of ammonia in the second NOx catalyst 5 becomes large.

In a period of time from T15 to T16, there exists a period of time in which the amount of adsorption of ammonia in the second NOx catalyst 5 becomes equal to or less than the first amount of adsorption, but in this period of time, the air fuel ratio of the exhaust gas is larger than the predetermined air fuel ratio, and hence, if the equivalent ratio is made larger, ammonia will be oxidized in the first NOx catalyst 3, so the equivalent ratio is not changed as it is relatively small. Then, when the air fuel ratio of the exhaust gas becomes equal to or less than the predetermined air fuel ratio at T16, the oxidation of ammonia in the first NOx catalyst 3 is suppressed, and so, the equivalent ratio is set to a relatively large value. This increases the amount of adsorption of ammonia in the second NOx catalyst 5.

At T17, the air fuel ratio of the exhaust gas is larger than the predetermined air fuel ratio. Accordingly, in order to suppress the oxidation of ammonia in the first NOx catalyst 3, the equivalent ratio is set to a relatively small value. This decreases the amount of adsorption of ammonia in the second NOx catalyst 5.

In a period of time from T17 to T18, there exists a period of time in which the amount of adsorption of ammonia in the second NOx catalyst 5 becomes equal to or less than the first amount of adsorption, but in this period of time, the air fuel ratio of the exhaust gas is larger than the predetermined air fuel ratio. Accordingly, in order to suppress the oxidation of ammonia in the first NOx catalyst 3, the equivalent ratio is not changed as it is relatively small. Then, when the air fuel ratio of the exhaust gas becomes equal to or less than the predetermined air fuel ratio at T18, the oxidation of ammonia in the first NOx catalyst 3 is suppressed, and so, the equivalent ratio is set to a relatively large value. This increases the amount of adsorption of ammonia in the second NOx catalyst 5.

When it becomes T19, the amount of adsorption of ammonia in the second NOx catalyst 5 reaches the second amount of adsorption, and it becomes unnecessary to supply ammonia to the second NOx catalyst 5. For that reason, even if the air fuel ratio of the exhaust gas is equal to or less than the predetermined air fuel ratio, the equivalent ratio is set to a relatively small value. This decreases the amount of adsorption of ammonia in the second NOx catalyst 5.

At T20, the air fuel ratio of the exhaust gas has become larger than the predetermined air fuel ratio, but at this time, the equivalent ratio has already been set to the relatively small value, and the equivalent ratio is not made to change. Accordingly, from T20, the degree of decrease in the amount of adsorption of ammonia in the second NOx catalyst 5 becomes large.

Figure 16:
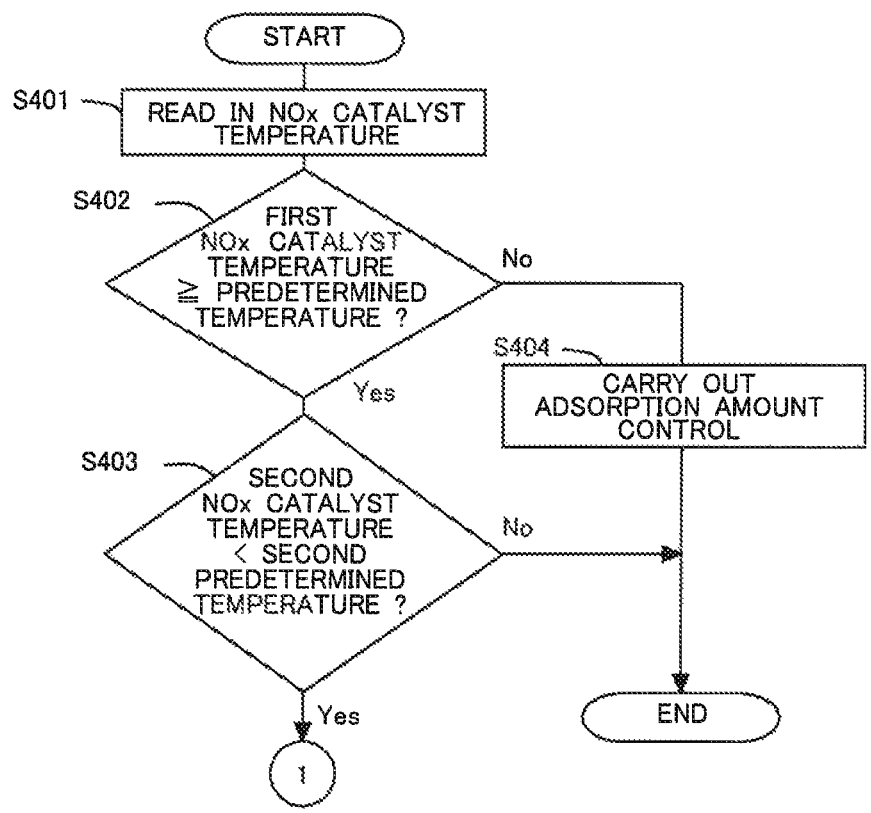
FIG. 16 is a flow chart showing a former half part of a flow for addition control of an additive agent according to the fourth embodiment of the present disclosure.
Figure 17:
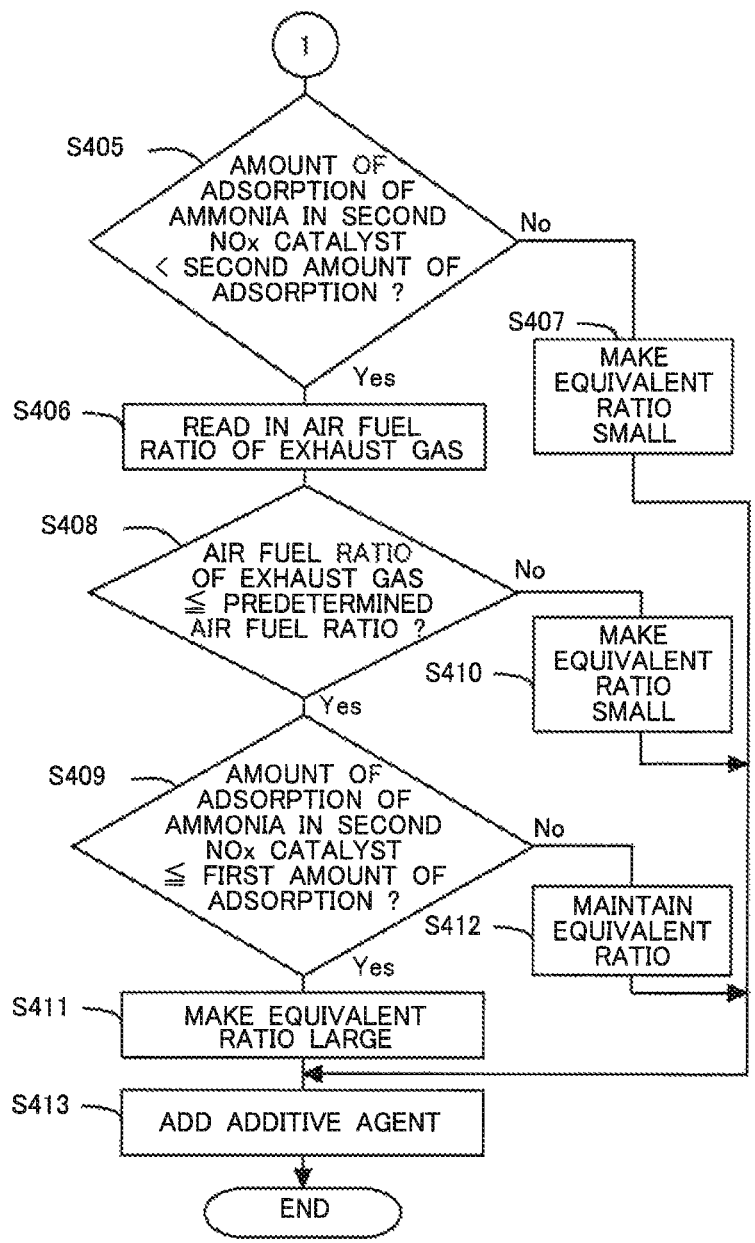
FIG. 17 is a flow chart showing a latter half of the flow for addition control of an additive agent according to the fourth embodiment of the present disclosure.

FIG. 16 and FIG. 17 are flow charts showing a flow or routine for addition control of the additive agent according to this fourth embodiment of the present disclosure. The routine in this flow chart is carried out by means of the ECU 10 at each predetermined time interval. Here, note that for those steps in which the same processings as in the aforementioned flow charts are carried out, the same reference numerals and characters are attached and the explanation thereof is omitted.

In step S401, the temperatures of the first NOx catalyst 3 and the second NOx catalyst 5 are read in. The temperature of the first NOx catalyst 3 is detected by the temperature sensor 13. Also, the temperature of the second NOx catalyst 5 is detected by the temperature sensor 16. Here, note that the temperature of the first NOx catalyst 3 and the temperature of the second NOx catalyst 5 can also be estimated based on the operating state of the internal combustion engine 1, without the use of the temperature sensor 13 and the second temperature sensor 16.

In step S402, it is determined whether the temperature of the first NOx catalyst 3 is equal to or higher than the predetermined temperature. In this step S402, it is determined whether ammonia is in a state where it can be oxidized in the first NOx catalyst 3. In cases where an affirmative determination is made in step S402, the routine goes to step S403. On the other hand, in cases where a negative determination is made in step S402, the routine goes to step S404, where the adsorption amount control is carried out. This adsorption amount control is control in which ammonia is made to be adsorbed to both the first NOx catalyst 3 and the second NOx catalyst 5, and well-known techniques can be used for this, so the explanation thereof is omitted. Here, note that in step S404, in place of the adsorption amount control, another control to carry out the addition of the additive agent without regard to the air fuel ratio of the exhaust gas may be carried out.

In step S403, it is determined whether the temperature of the second NOx catalyst 5 is less than the second predetermined temperature. The second predetermined temperature referred to herein is a temperature at which the rate of oxidation of ammonia in the second NOx catalyst 5 begins to increase when a sufficient amount of oxygen is contained in the exhaust gas, and it has been obtained in advance by experiments, simulations or the like. In this step S403, it is determined whether it is in a state where the amount of adsorption of ammonia can be made to increase in the second NOx catalyst 5. In cases where an affirmative determination is made in step S403, the routine goes to step S405, whereas in cases where a negative determination is made, this routine is ended. Here, note that in cases where a negative determination is made in step S403, ammonia will be oxidized when the air fuel ratio of the exhaust gas is larger than the predetermined air fuel ratio in any of the first NOx catalyst 3 and the second NOx catalyst 5. In such a case, the equivalent ratio control may be carried out in order to reduce NOx in the first NOx catalyst 3. This equivalent ratio control is separately carried out by the ECU 10.

In step S405, it is determined whether the amount of adsorption of ammonia in the second NOx catalyst 5 is less than the second amount of adsorption. In cases where an affirmative determination is made in step S405, the routine goes to step S406. On the other hand, in cases where a negative determination is made in step S405, the routine goes to step S407, where the equivalent ratio is set to a relatively small value. The equivalent ratio set in step S407 is an equivalent ratio in the case where the air fuel ratio of the exhaust gas is larger than the predetermined air fuel ratio in FIG. 13. That is, the amount of adsorption of ammonia in the second NOx catalyst 5 is sufficiently large, so the outflow of ammonia from the second NOx catalyst 5 is suppressed by making the equivalent ratio relatively small.

In step S406, the air fuel ratio of the exhaust gas flowing into the first NOx catalyst 3 is read in. This air fuel ratio of the exhaust gas can be detected by the air fuel ratio sensor 12.

In step S408, it is determined whether the air fuel ratio of the exhaust gas flowing into the first NOx catalyst 3 is equal to or less than the predetermined air fuel ratio. In this step S408, it is determined whether the air fuel ratio of the exhaust gas is an air fuel ratio at which ammonia is not oxidized in the first NOx catalyst 3. In cases where an affirmative determination is made in step S408, the routine goes to step S409. On the other hand, in cases where a negative determination is made in step S408, the routine goes to step S410, where the equivalent ratio is set to a relatively small value. The equivalent ratio set in step S410 is an equivalent ratio in the case where the air fuel ratio of the exhaust gas is larger than the predetermined air fuel ratio in FIG. 13. That is, the air fuel ratio of the exhaust gas and the temperature of the first NOx catalyst 3 are in a state where ammonia is oxidized in the first NOx catalyst 3, so the oxidation of ammonia is suppressed by making the equivalent ratio relatively small.

In step S409, it is determined whether the amount of adsorption of ammonia in the second NOx catalyst 5 is equal to or less than the first amount of adsorption. In cases where an affirmative determination is made in step S409, the routine goes to step S411, where the equivalent ratio is set to a relatively large value. The equivalent ratio set in step S411 is an equivalent ratio in the case where the air fuel ratio of the exhaust gas is equal to or less than the predetermined air fuel ratio in FIG. 13. That is, the equivalent ratio is set to a value at which the amount of adsorption of ammonia in the second NOx catalyst 5 is increased. On the other hand, in cases where a negative determination is made in step S409, the routine goes to step S412, where the equivalent ratio is maintained. In cases where a negative determination is made in step S409, the amount of adsorption of ammonia in the second NOx catalyst 5 is in a state where it is larger than the first amount of adsorption and smaller than the second amount of adsorption. In such a case, the equivalent ratio at a current point in time is maintained.

In step S413, the additive agent is added from the addition valve 4 so that the equivalent ratio becomes a set value. Here, note that in this fourth embodiment, the equivalent ratio is set according to the relation shown in FIG. 13, but instead of this, the equivalent ratio can also be set according to the relation of FIG. 14.

In this manner, NOx flowing out from the first NOx catalyst 3 can be reduced in the second NOx catalyst 5, by supplying the additive agent to the second NOx catalyst 5.

Fifth Embodiment

In a fifth embodiment of the present disclosure, in the construction shown in FIG. 12, in cases where the temperature of the first NOx catalyst 3 is equal to or higher than the predetermined temperature and the amount of adsorption of ammonia in the second NOx catalyst 5 is equal to or less than the first amount of adsorption, the air fuel ratio of the exhaust gas flowing into the first NOx catalyst 3 is actively made equal to or less than the predetermined air fuel ratio. In this manner, when the air fuel ratio of the exhaust gas becomes equal to or less than the predetermined air fuel ratio, the oxidation of ammonia in the first NOx catalyst 3 is suppressed, so that the equivalent ratio can be made large. Accordingly, it becomes unnecessary to wait for the air fuel ratio of the exhaust gas to drop due to acceleration of the internal combustion engine 1, etc., so the additive agent can be quickly supplied to the second NOx catalyst 5.

Figure 18:
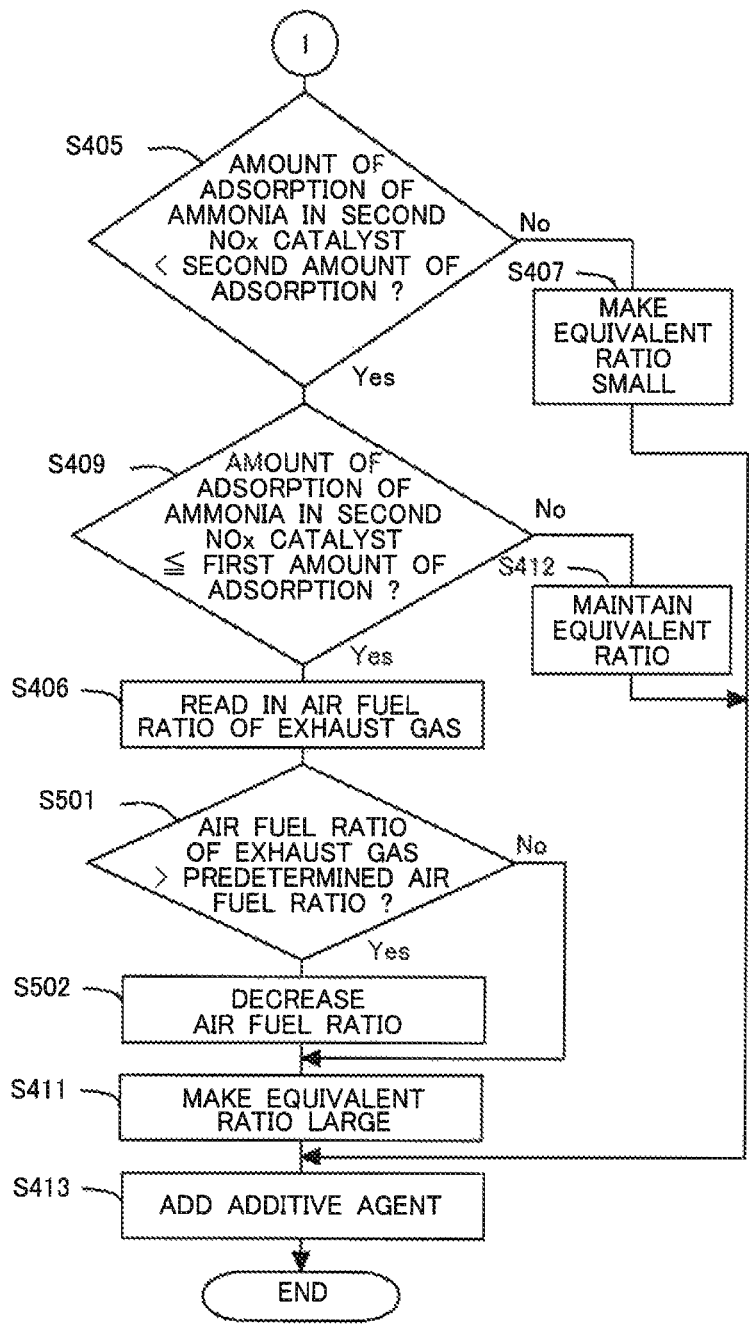
FIG. 18 is a flow chart showing a flow for addition control of an additive agent according to the fifth embodiment of the present disclosure.

FIG. 18 is a flow chart showing a flow or routine for addition control of the additive agent according to this fifth embodiment of the present disclosure. The processings before step S405 in FIG. 18 are the same as those in the flow chart shown in FIG. 16. The routine in this flow chart is carried out by means of the ECU 10 at each predetermined time interval. Here, note that for those steps in which the same processings as in the aforementioned flow chart are carried out, the same reference numerals and characters are attached and the explanation thereof is omitted.

In the flow chart shown in FIG. 18, in cases where an affirmative determination is made in step S405, the routine goes to step S409. Further, in cases where an affirmative determination is made in step S409, the routine goes to step S406. Then, the processing of step S406 ends, the routine goes to step S501, where it is determined whether the air fuel ratio of the exhaust gas read in step S406 exceeds the predetermined air fuel ratio. In cases where an affirmative determination is made in step S406, the routine goes to step S502, whereas in cases where a negative determination is made, the routine goes to step S411. In step S502, it is determined whether the air fuel ratio of the exhaust gas flowing into the first NOx catalyst 3 is decreased equal to or less than the predetermined air fuel ratio. In this case, the air fuel ratio of the exhaust gas is made to become equal to or less than the predetermined air fuel ratio, similar to step S205. Thereafter, the routine goes to step S411. Here, note that in this fifth embodiment, the equivalent ratio is set according to the relation shown in FIG. 13, but instead of this, the equivalent ratio can also be set according to the relation of FIG. 14.

In this manner, even in cases where the air fuel ratio of the exhaust gas is larger than the predetermined air fuel ratio, by actively decreasing the air fuel ratio of the exhaust gas, the equivalent ratio can be made large, while suppressing the oxidation of ammonia, so that the additive agent can be supplied to the second NOx catalyst 5. As a result of this, the amount of adsorption of ammonia in the second NOx catalyst 5 can be caused to increase in a quick manner, thus making it possible to suppress the NOx reduction rate from being decreased.

Sixth Embodiment

Figure 19:
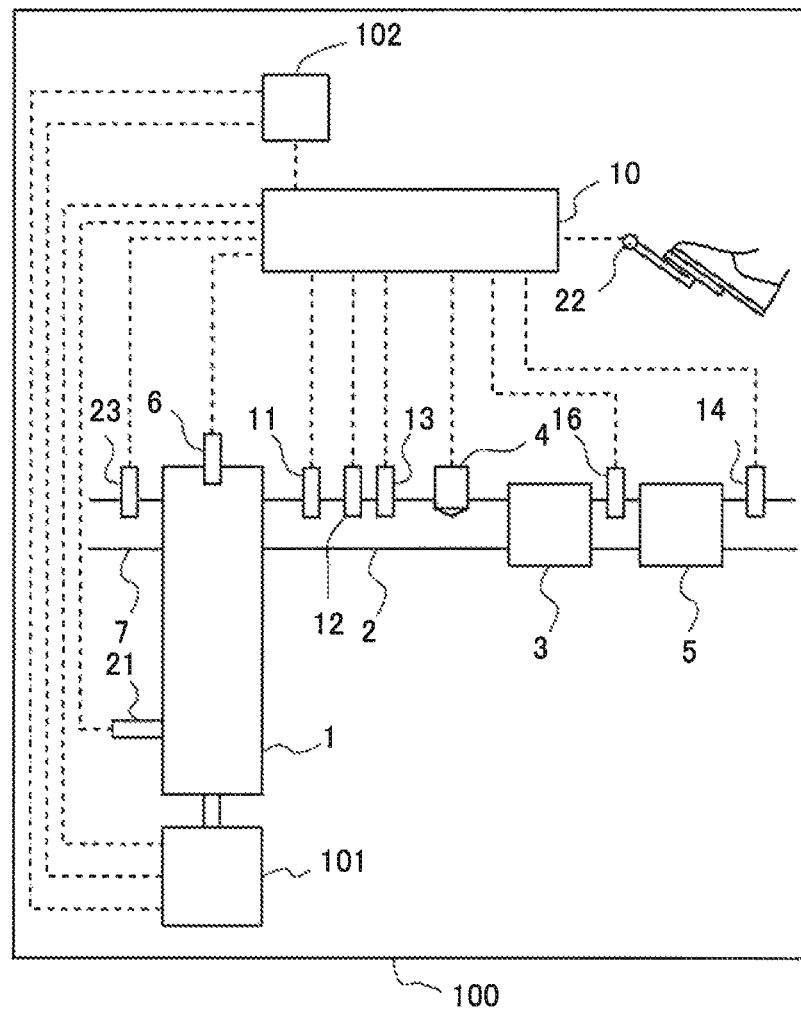
FIG. 19 is a view showing the schematic construction of an internal combustion engine and its exhaust system according to a sixth embodiment of the present disclosure.

FIG. 19 is a view showing the schematic construction of an internal combustion engine and its exhaust system according to a sixth embodiment of the present disclosure. In the following, a construction different from that shown in FIG. 1 will mainly be explained. In FIG. 19, an internal combustion engine 1 is mounted in a hybrid vehicle 100, similar to FIG. 9. Further, in FIG. 19, provision is made for a first NOx catalyst 3 and a second NOx catalyst 5, similar to FIG. 12. The other devices, parts and so on are the same as those in the above-mentioned embodiments, so the explanation thereof is omitted.

Figure 20:
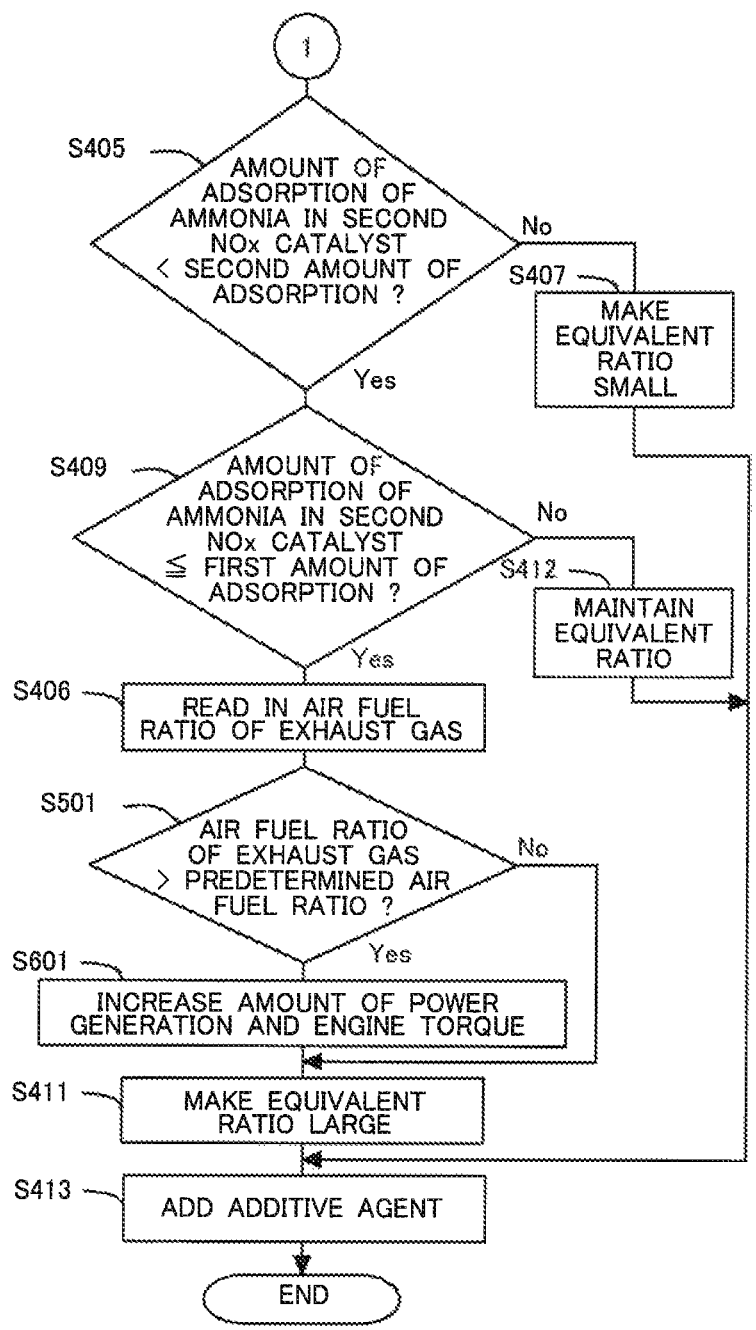
FIG. 20 is a flow chart showing a flow for addition control of an additive agent according to the sixth embodiment of the present disclosure.

In this sixth embodiment, similar to the third embodiment, the amount of power generated by the generator 101 is increased so that the torque produced by the internal combustion engine 1 is increased, thereby decreasing the air fuel ratio of the exhaust gas. FIG. 20 is a flow chart showing a flow or routine for addition control of the additive agent according to this sixth embodiment of the present disclosure. The processings before step S405 in FIG. 20 are the same as those in the flow chart shown in FIG. 16. The routine in this flow chart is carried out by means of the ECU 10 at each predetermined time interval. Here, note that for those steps in which the same processings as in the aforementioned flow chart are carried out, the same reference numerals and characters are attached and the explanation thereof is omitted.

In the flow chart shown in FIG. 20, in cases where an affirmative determination is made in step S501, the routine goes to step S601. In step S601, the amount of power generated by the generator 101 is increased. With this, the engine torque is increased, and the air fuel ratio of the exhaust gas flowing into the first NOx catalyst 3 drops accompanying this. At this time, the amount of power generated by the generator 101 is adjusted so that the air fuel ratio of the exhaust gas flowing into the first NOx catalyst 3 may become equal to or less than the predetermined air fuel ratio. That is, the ECU 10 calculates, based on the relation shown in FIG. 10, the engine torque at which the air fuel ratio of the exhaust gas becomes equal to or less than the predetermined air fuel ratio at the engine rotational speed at the current point in time, and sets the amount of power generated by the generator 101 so as to provide the engine torque thus calculated. The relation between the engine torque at the current point in time and the amount of power generated by the generator 101 has been obtained in advance by experiments, simulations, or the like. Here, note that in this sixth embodiment, the equivalent ratio is set according to the relation shown in FIG. 13, but instead of this, the equivalent ratio can also be set according to the relation of FIG. 14.

Thus, even in cases where the air fuel ratio of the exhaust gas is larger than the predetermined air fuel ratio, the air fuel ratio can be decreased to a value equal to or less than the predetermined air fuel ratio, by making the engine torque larger, while increasing the amount of power generated by the generator 101. As a result of this, the amount of adsorption of ammonia in the second NOx catalyst 5 can be caused to increase in a quick manner, while making the equivalent ratio larger, so that the NOx reduction rate can be suppressed from being decreased.

The invention claimed is:

1. An exhaust gas purification apparatus for an internal combustion engine comprising:
   an NOx selective catalytic reduction catalyst that is arranged in an exhaust passage of the internal combustion engine and selectively reduces NOx in an exhaust gas by using ammonia as a reducing agent;
   an addition valve that is arranged in said exhaust passage at the upstream side of said NOx selective catalytic reduction catalyst and adds ammonia or a precursor of ammonia into the exhaust gas;
   a temperature sensor configured to acquire a temperature of said NOx selective catalytic reduction catalyst;
   an air fuel ratio sensor configured to acquire an air fuel ratio of the exhaust gas flowing into said NOx selective catalytic reduction catalyst; and
   a controller configured to make an amount of ammonia or the precursor of ammonia to be added into the exhaust gas from said addition valve larger, when the air fuel ratio acquired by said air fuel ratio sensor is small, than when it is large, in cases where the temperature acquired by said temperature sensor is equal to or higher than a predetermined temperature at which ammonia is oxidized.

2. The exhaust gas purification apparatus for an internal combustion engine as set forth in claim 1, wherein
   said controller is further configured to estimate an amount of the ammonia which is adsorbed to said NOx selective catalytic reduction catalyst; and
   in cases where the temperature acquired by said temperature sensor is equal to or higher than said predetermined temperature, when the air fuel ratio of the exhaust gas flowing into said NOx selective catalytic reduction catalyst at the time the amount of the ammonia adsorbed to said NOx selective catalytic reduction catalyst is smaller than a predetermined amount of adsorption is larger than a predetermined air fuel ratio, said controller is further configured to make the air fuel ratio of the exhaust gas flowing into said NOx selective catalytic reduction catalyst equal to or less than said predetermined air fuel ratio.

3. The exhaust gas purification apparatus for an internal combustion engine as set forth in claim 2, further comprising:
   a generator that generates electricity by means of power of said internal combustion engine; wherein
   said controller is further configured to make an air fuel ratio of a mixture smaller, when a torque produced by said internal combustion engine is large, than when it is small, such that an amount of power generated by said generator is increased and the torque produced by said internal combustion engine is increased, thereby making the air fuel ratio of the exhaust gas flowing into said NOx selective catalytic reduction catalyst equal to or less than said predetermined air fuel ratio.

4. The exhaust gas purification apparatus for an internal combustion engine as set forth in claim 1, wherein
   said NOx selective catalytic reduction catalyst is configured by including a first NOx catalyst and a second NOx catalyst that is arranged in said exhaust passage at the downstream side of said first NOx catalyst;
   said temperature sensor is configured so as to be a first temperature sensor for acquiring the temperature of said first NOx catalyst;
   provision is further made for a second temperature sensor configured to acquire the temperature of said second NOx catalyst;

said controller is further configured to estimate an amount of ammonia adsorbed to said second NOx catalyst; and in cases where the temperature of said first NOx catalyst acquired by said first temperature sensor is equal to or higher than said predetermined temperature, in cases where the temperature of said second NOx catalyst acquired by said second temperature sensor is lower than a second predetermined temperature, and in cases where the amount of ammonia adsorbed to said second NOx catalyst is equal to or less than a predetermined lower limit adsorption amount, said controller is further configured to make the amount of ammonia or the amount of the precursor thereof to be added into the exhaust gas from said addition valve larger, when the air fuel ratio acquired by said air fuel ratio sensor is small, than when it is large.

5. The exhaust gas purification apparatus for an internal combustion engine as set forth in claim 4, wherein in cases where the temperature of said first NOx catalyst acquired by said first temperature sensor is equal to or higher than said predetermined temperature, and in cases where the temperature of said second NOx catalyst acquired by said second temperature sensor is lower than said second predetermined temperature, when the air fuel ratio of the exhaust gas flowing into said first NOx catalyst at the time the amount of the ammonia adsorbed to said second NOx catalyst is equal to or less than said predetermined lower limit adsorption amount is larger than the predetermined air fuel ratio, said controller is further configured to make the air fuel ratio of the exhaust gas flowing into said first NOx catalyst equal to or less than said predetermined air fuel ratio.

6. The exhaust gas purification apparatus for an internal combustion engine as set forth in claim 5, further comprising:

a generator that generates electricity by means of power of said internal combustion engine; wherein said controller is further configured to make an air fuel ratio of a mixture smaller, when a torque produced by said internal combustion engine is large, than when it is small, such that an amount of power generated by said generator is increased and the torque produced by said internal combustion engine is increased, thereby making the air fuel ratio of the exhaust gas flowing into said first NOx catalyst equal to or less than said predetermined air fuel ratio.

* * * * *